United States Patent
Schuckers et al.

(10) Patent No.: US 9,367,729 B2
(45) Date of Patent: *Jun. 14, 2016

(54) MULTI-RESOLUTIONAL TEXTURE ANALYSIS FINGERPRINT LIVENESS SYSTEMS AND METHODS

(71) Applicant: West Virginia University, Morgantown, WV (US)

(72) Inventors: Stephanie Schuckers, Canton, NY (US); Aditya Abhyankar, Maharashtra (IN); Lawrence Hornak, Morgantown, WV (US)

(73) Assignee: West Virginia University, Morgantown, WV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/291,342

(22) Filed: May 30, 2014

(65) Prior Publication Data

US 2014/0270419 A1  Sep. 18, 2014

Related U.S. Application Data

(60) Division of application No. 13/938,477, filed on Jul. 10, 2013, now abandoned, which is a continuation of application No. 13/313,444, filed on Dec. 7, 2011, now Pat. No. 8,498,458, which is a division of application No. 11/870,071, filed on Oct. 10, 2007, now Pat. No. 8,090,163.

(60) Provisional application No. 60/850,664, filed on Oct. 10, 2006, provisional application No. 60/919,043, filed on Mar. 20, 2007.

(51) Int. Cl.
*G06K 9/00* (2006.01)

(52) U.S. Cl.
CPC ............ *G06K 9/001* (2013.01); *G06K 9/00107* (2013.01); *G06K 9/00114* (2013.01)

(58) Field of Classification Search
None
See application file for complete search history.

(56) References Cited

U.S. PATENT DOCUMENTS

| | | | |
|---|---|---|---|
| 4,872,203 A | 10/1989 | Asai et al. | |
| 5,572,597 A * | 11/1996 | Chang et al. | 382/125 |
| 7,133,541 B2 | 11/2006 | Haselsteiner et al. | |
| 7,738,681 B1 | 6/2010 | Rannow et al. | |
| 8,090,163 B2 * | 1/2012 | Schuckers et al. | 382/125 |
| 2003/0039382 A1 | 2/2003 | Yau et al. | |
| 2003/0169910 A1 | 9/2003 | Reisman et al. | |
| 2004/0228508 A1 | 11/2004 | Shigeta | |

(Continued)

OTHER PUBLICATIONS

Abhyankar et al. "Fingerprint Liveness Detection Using local Ridge Frequencies and Multiresolution Texture Analysis Techniques." IEEE International Conference on Image Processing, Oct. 8-11, 2006, pp. 321-324.*

(Continued)

*Primary Examiner* — Jon Chang
(74) *Attorney, Agent, or Firm* — Thomas | Horstemeyer LLP; Scott Horstemeyer; Randy Schoen

(57) ABSTRACT

Various systems, methods, and programs embodied in computer-readable mediums are provided for fingerprint liveness detection. In one embodiment, a method for determining fingerprint liveness is provided that comprises receiving a plurality of image analysis data of a fingerprint image; condensing the plurality of image analysis data; and determining liveness of the fingerprint image based upon the condensed data.

20 Claims, 13 Drawing Sheets

(56) References Cited

U.S. PATENT DOCUMENTS

| | | | |
|---|---|---|---|
| 2005/0084143 | A1 | 4/2005 | Kramer et al. |
| 2005/0089201 | A1 | 4/2005 | Blancas |
| 2005/0123177 | A1 | 6/2005 | Abiko |
| 2005/0265585 | A1 | 12/2005 | Rowe |
| 2005/0265586 | A1 | 12/2005 | Rowe et al. |
| 2005/0271258 | A1 | 12/2005 | Rowe |
| 2006/0002597 | A1 | 1/2006 | Rowe |
| 2006/0056700 | A1 | 3/2006 | Abiko et al. |
| 2006/0062438 | A1 | 3/2006 | Rowe |
| 2006/0274921 | A1 | 12/2006 | Rowe |
| 2007/0014443 | A1 | 1/2007 | Russo |
| 2008/0025580 | A1 | 1/2008 | Sidlauskas et al. |
| 2008/0095413 | A1 | 4/2008 | Yau et al. |
| 2009/0245596 | A1* | 10/2009 | Niinuma .................... 382/124 |

OTHER PUBLICATIONS

Parthasaradhi et al. "Time-Series Detection of Perspiration as Liveness Test in Fingerprint Devices." IEEE Transactions on Systems, Man, and Cybernetics-Part C: Applications and Reviews, vol. 35, No. 3, Aug. 2005, pp. 335-343.*

"Characterization, Similarity Score and Uniqueness Associated with Perspiration Pattern," A. Abhyankar and S. Schuckers, Lectyure Notes in Computer Science, No. 3546, pp. 301-309, 2005, 9 pages.

"Combining Support Vector and Mathematical Programming Methods for Classification," J. Platt, Chap. 12: Advances in Kernel Methods—Support Vector Learning, pp. 307-326, 1999, 43 pages.

"Bagging Predictors," L. Breiman, Machine Learning, 24(2): 123-140, 1996, 20 pages.

"Fingerprint Image Enhancement: Algorithm and Performance Evaluation," L. Hong, Y. Wang, and A. Jian, IEEE Trans. on Pattern Analysis and Machine Intelligence, vol. 20, No. 8, pp. 777-789, Aug. 1998, 30 pages.

"The alternating decision tree learning algorithm," Y. Freund and L. Mason, Proceeding of the Sixteenth International Conference on Machine Learning, Bled, Slovenia, pp. 124-133, 1999, 10 pages.

"The empirical mode decomposition and the hilbert spectrum for nonlinear and non-stationary time series analysis," N. E. Huang, S. R. Shea, M.C. Long, H.H. Wu, Q. Shih, N.C. Zheng, C.C. Yen, H. Ding, and H. Liu; Proc. R. Soc. London, vol. A-545, pp. 903-995, 1998, 96 pages.

"Random Forests," L. Breiman, Machine Learning, 45(1): 5-32, 2001, 29 pages.

"Determination of vitality from a non-invasive biomedical measurement for use in fingerprint scanners," R. Derakshani, S. Schuckers, L. Hornak, and L. Gorman, Pattern Recognition Journal, vol. 36, No. 2, 2003, 14 pages.

"Instance-based learning algorithms," D. Aha and D. Kibler, Machine Learning, vol. 6, pp. 37-66, 1991, 30 pages.

"A Theory for Multiresolution Signal Decomposition: The Wavelet Representation", Stephane G. Mallat, from IEEE Transactions on Pattern Analysis and Machine Intelligence vol. II. No. 7, Jul. 1989, pp. 1-20.

Wavelets and Their Applications, M.-B. Ruskai, G. Beylkin, R. Coifman, I. Daubechies, S. Mallat, Y. Meyers, and L. Raphael (eds.), Jones and Bartlett, Boston, pp. 453-471, 1992.

C4.5: Programs for Machine Learning, R. Quinlan, Morgan Kaufmann Publishers, Chapter 1, pp. 1-26, 1993.

Ten Lectures on Waveleets, I. Daubechies, Society of Industrial and Applied Mathematics, Chapter 5, pp. 129-166, 1992.

"Empirical Mode Decomposition Liveness Check in Fingerprint Time Series Captures", Abhyankar et al., Conference on Computer Vision and Pattern Recognition Workshop, Jun. 17, 2006, 8 pages.

"Liveness Detection for Fingerprint Scanners Based on the Statistics of Wavelet Signal Processing", Tan et al., Conference on Computer Vision and Pattern Recognition Workshop, Jun. 17, 2006, 8 pages.

"Wavelet Based Fingerprint Liveness Detection", Moon et al., Electronics Letters, vol. 41, No. 20, Sep. 29, 2005, pp. 1112-1113.

* cited by examiner (a) Live Samples  (b) Play-Doh Samples (c) Gelatin Samples  (d) Silicone Samples

MULTI-RESOLUTIONAL TEXTURE ANALYSIS FINGERPRINT LIVENESS SYSTEMS AND METHODS

CROSS REFERENCE TO RELATED APPLICATIONS

This application is a divisional application of application Ser. No. 13/938,477, filed Jul. 10, 2013, now abandoned, which is a continuation application of application Ser. No. 13/313,444, filed Dec. 7, 2011, now U.S. Pat. No. 8,498,458, which is a divisional application of application Ser. No. 11/870,071, filed Oct. 10, 2007, now U.S. Pat. No. 8,090,163, which claims priority to U.S. provisional applications entitled "FINGERPRINT LIVENESS DETECTION USING LOCAL RIDGE FREQUENCIES AND MULTIRESOLUTION TEXTURE ANALYSIS TECHNIQUES" having Ser. No. 60/850,664, filed Oct. 10, 2006, and "NEW WAVELET-BASED FINGERPRINT LIVENESS METHOD" having Ser. No. 60/919,043, filed Mar. 20, 2007, all of which are entirely incorporated herein by reference.

STATEMENT REGARDING FEDERALLY SPONSORED RESEARCH OR DEVELOPMENT

This invention was made with government support under agreement 0325333 and 0325640 awarded by the National Science Foundation, Information Technology Research. The Government has certain rights in the invention.

BACKGROUND

Biometric systems are emerging technologies that enable the authentication of an individual based on physiological or behavioral characteristics. Biometric techniques include recognizing faces, fingerprints, hand geometry, palms, voices, gait, irises, signature, etc. Among these biometric identifiers, fingerprint recognition is considered the most popular and efficient technique. However, a fingerprint sensor system is subject to various threats such as attacks at the sensor level, replay attacks on the data communication stream, and attacks on the database. A variety of fingerprint sensors may be spoofed through fake fingers using moldable plastic, clay, Play-Doh, wax or gelatin. From a security and accountability perspective, a biometric system should have the ability to detect when fake biometric samples are presented.

SUMMARY

Embodiments of the present disclosure methods and systems related to multi-resolutional texture analysis fingerprint liveness.

Briefly described, one embodiment, among others, comprises a method for determining fingerprint liveness. The method comprises receiving a plurality of image analysis data of a fingerprint image; condensing the plurality of image analysis data; and determining liveness of the fingerprint image based upon the condensed data.

Another embodiment, among others, comprises a system. The system comprises a processor circuit having a processor and a memory and a detection system stored in the memory and executable by the processor. The detection system comprises logic that receives a plurality of image analysis data of a fingerprint image; logic that condenses the plurality of image analysis data; and logic that determines liveness of the fingerprint image based upon the condensed data.

Another embodiment, among others, comprises a system. The system comprises means for receiving a plurality of image analysis data of a fingerprint image; means for condensing the plurality of image analysis data; and means for determining liveness of the fingerprint image based upon the condensed data.

Another embodiment, among others, comprises a method for determining fingerprint liveness. The method comprises receiving first and second images of a fingerprint, wherein the second image is obtained a predetermined time after the first image; detecting a singularity point; determining a time domain signal for the singularity point using data from the first and second images; decomposing the time domain signal using a wavelet packet transform; determining an entropy of the decomposed signals; determining liveness of the fingerprint images based upon the entropy of the sifted signals.

Another embodiment, among others, comprises a system. The system comprises a processor circuit having a processor and a memory and a detection system stored in the memory and executable by the processor. The detection system comprises logic that receives first and second images of a fingerprint, wherein the second image is obtained a predetermined time after the first image; logic that detects a singularity point; logic that determines a time domain signal for the singularity point using data from the first and second images; logic that decomposes the time domain signal using a wavelet packet transform; logic that determines an entropy of the decomposed signals; logic that sifts the decomposed signals; and logic that determines liveness of the fingerprint images based upon the entropy of the sifted signals.

Other systems, apparatus, methods, features, and advantages of the present disclosure will be or become apparent to one with skill in the art upon examination of the following drawings and detailed description. It is intended that all such additional systems, apparatus, methods, features, and advantages be included within this description, be within the scope of the present disclosure, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
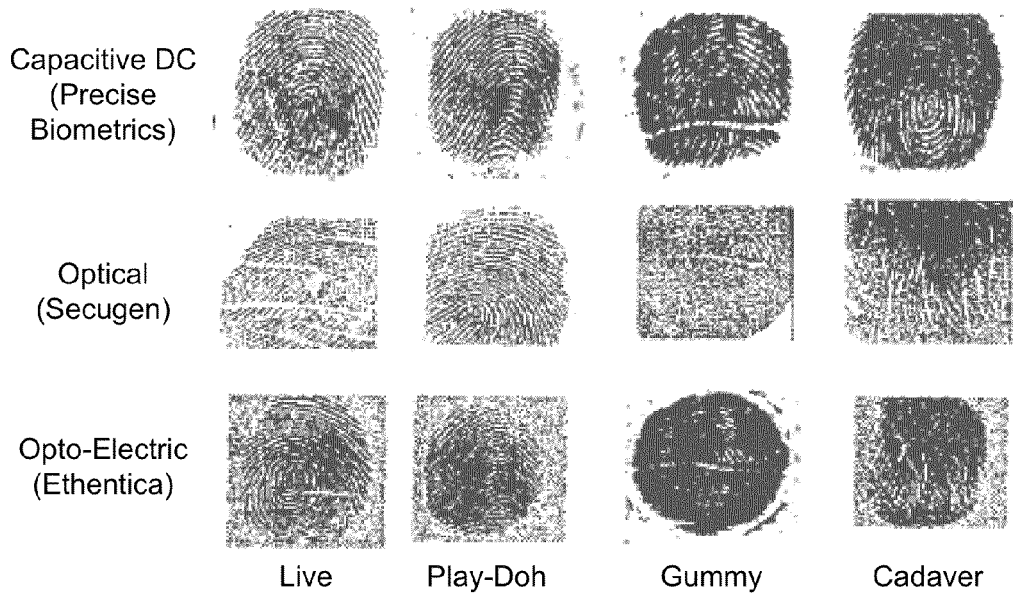
FIG. 1 is an illustration of live, synthetic, and dismembered fingerprint images obtained using capacitive DC, optical, and opto-electric sensing technologies.

Disclosed herein are various embodiments of methods related to multi-resolutional texture analysis fingerprint liveness. Reference will now be made in detail to the description of the embodiments as illustrated in the drawings, wherein like reference numbers indicate like parts throughout the several views.

Biometric systems are emerging technologies that enable the identification and verification of an individual based upon physiological or behavioral characteristics. Biometric identifiers are replacing traditional identifiers, as it is difficult to steal, replace, forget or transfer them. Fingerprint recognition systems (FRS) are among the oldest and most popular biometric authentication systems. Automatic fingerprint matching involves determining the degree of similarity between two fingerprint impressions by comparing their ridge structures and/or the spatial distributions of their minutiae points. However, it may be possible to spoof different fingerprint technologies by means of relatively crude and inexpensive methods.

A fingerprint sensor system may be subject to various threats like attacks at the sensor level using artificial, or in the extreme, dismembered fingers. It may be possible to spoof a variety of fingerprint sensors with a dismembered finger or a well-duplicated synthetic finger. Spoofing is the fraudulent entry of unauthorized personnel through a fingerprint recognition system by using a faux fingerprint sample. Spoofing techniques can utilize synthetic fingers made of materials including, but not limited to, gelatin (gummy fingers), moldable plastic, clay, Play-Doh, wax, and silicon. FIG. 1 is an illustration of live, artificial (i.e., Play-Doh and gummy), and dismembered (i.e., cadaver) fingerprint images obtained using capacitive DC, optical, and opto-electric sensing technologies. The synthetic fingers may be developed from casts of live fingers or latent fingerprints, which were obtained using dental or other casting materials.

Liveness detection is an anti-spoofing method that assist the fingerprint scanner in determining whether the introduced biometric is coming from a live source. Liveness detection in a fingerprint biometric system can include, but is not limited to, measuring skin resistance, temperature, pulse oximetry, and electrocardiogram (ECG). Analysis of ridge frequencies, intensity, and/or texture in fingerprint images can also be used as detection methods for liveness. In addition, perspiration patterns in fingerprint images can be used to detect liveness. Unlike artificial and cadaver fingers, live fingers have a distinctive spatial perspiration phenomenon both statistically and dynamically.

Function Analysis

One embodiment, among others, of liveness detection comprises classification analysis based upon features of a fingerprint image. Fingerprint image features (or functions) can be derived from an image using multi-resolution texture analysis and/or inter-ridge frequency analysis. Other information derived from the image, such as ridge reliability, may also be utilized. Classification analysis, such as Fuzzy c-means classifier analysis, evaluates the features/functions to determine the image type.

Multi-resolution texture analysis techniques utilize the grayscale of the fingerprint image to develop first and/or second order features related to the image. The gray level associated with the pixels of a fingerprint image can be used to analyze the liveness associated with that fingerprint image. For an 8-bit grayscale image, there are 256 (0-255) different possible levels (or bins) for each pixel. Other grayscales would provide different levels of resolution. A histogram will graphically display the distribution of pixels (y-axis) among the possible grayscale values (x-axis). Visually it is very pertinent that gray level distribution in a fingerprint image changes when the physical structure changes. Several texture features are used to quantify this information. Texture features can be divided into first, second and higher order statistical features. The grayscale distribution of the single pixels is modeled as first order statistics while second order statistics refer to the joint grayscale function between pairs of pixels.

First order features refer to the visually observed differences between "live" and "not live" fingerprints illustrated in FIG. 1. This can be confirmed by changes in the histograms of different fingerprints. If H(n) indicates the normalized histogram, the first order features can include the following:

Energy:

$$e = \sum_{n=0}^{N-1} H(n)^2; \quad \text{(EQN. 1)}$$

Entropy:

$$s = \sum_{n=0}^{N-1} H(n) \log H(n); \quad \text{(EQN. 2)}$$

Median:

$$M = \operatorname*{argmin}_{a} \left( \sum_n H(n)|n - a| \right); \quad \text{(EQN. 3)}$$

Variance:

$$\sigma^2 = \sum_{n=0}^{N} (n - \mu)^2 H(n); \quad \text{(EQN. 4)}$$

Skewness:

$$\gamma_1 = \frac{1}{\sigma^3} \sum_{n=0}^{N-1} (n - \mu)^3 H(n); \quad \text{(EQN. 5)}$$

Kurtosis:

$$\gamma_2 = \frac{1}{\sigma^4} \sum_{n=0}^{N-1} (n - \mu)^4 H(n); \text{ and} \quad \text{(EQN. 6)}$$

Coefficient of Variation:

$$cv = \frac{\sigma}{\mu}; \quad \text{(EQN. 7)}$$

where N is equal to the number of bins (e.g., 256 for an 8-bit greyscale) and $\mu$ and $\sigma$ are the mean and the standard deviation, respectively.

Multi-resolution texture analysis techniques can also utilize second order features that represent second order statistics of the fingerprint image. A co-occurrence matrix ($\gamma$), which is essentially the joint probability function of two image elements in a given direction and distance, $\gamma(n, m|d, \theta)$, is calculated. Symmetric directions $\theta=0°, 45°, 90°, 135°$ can be used to avoid dependency on the direction. Based upon the definition of the co-occurrence matrix, second order features, such as the following, can be determined:

Cluster Shade:

$$CS = \frac{\sum_{n=0}^{N} \sum_{m=0}^{N} (n - \mu_x + m - \mu_y)^3 \Upsilon(n, m)}{(\sigma_x^2 + \sigma_y^2 + 2\rho\sigma_x\sigma_y)^{3/2}}; \text{ and} \quad \text{(EQN. 8)}$$

Cluster Prominence:

$$CP = \frac{\sum_{n=0}^{N} \sum_{m=0}^{N} (n - \mu_x + m - \mu_y)^4 \Upsilon(n, m)}{(\sigma_x^2 + \sigma_y^2 + 2\rho\sigma_x\sigma_y)^2}. \quad \text{(EQN. 9)}$$

Multi-resolution second order texture analysis is performed using bi-orthogonal wavelets. Other methods for performing time-frequency analysis include, but are not limited to, wavelet packets, Daubechies wavelets, Harr wavelets, and short-time Fourier transforms. A bi-orthogonal pyramid of the fingerprint image is computed and then co-occurrence matrix $\gamma$ is calculated using fixed distance d. A co-occurrence matrix may be calculated for a single level or for each level of the pyramid.

Figure 2:
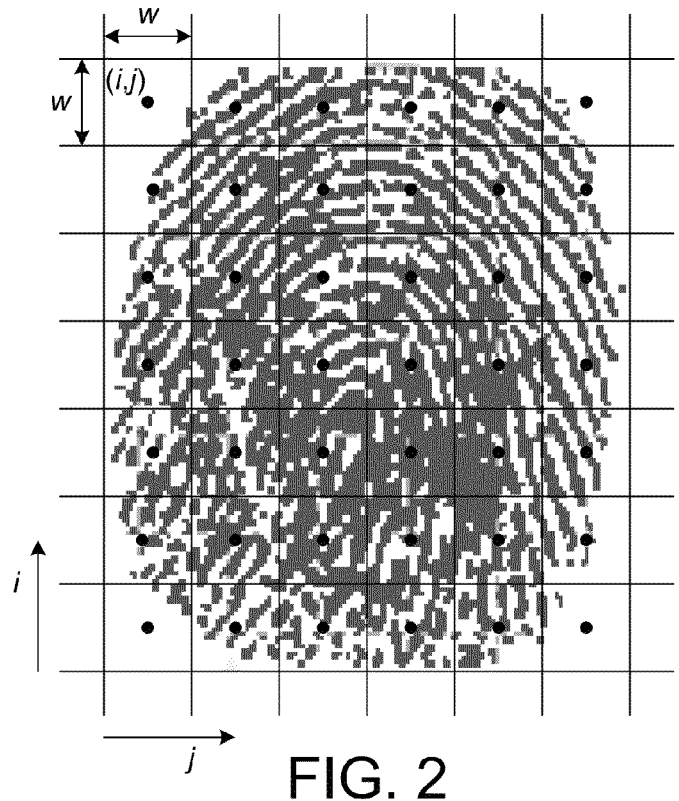
FIG. 2 is an illustration of sectioning a fingerprint image of FIG. 1 into blocks according to an embodiment of the present invention.

Fingerprint local-ridge frequency analysis is also performed on the fingerprint image. FIG. 2 is an illustration of sectioning a fingerprint image of FIG. 1 into blocks according to an embodiment of the present invention. The image is divided into blocks of size w×w, each centered at (i, j). The local-ridge frequency can be calculated for each image block as:

$$\Gamma(i, j) = \frac{\sum_{u=-w_\gamma/2}^{w_\gamma/2} \sum_{v=-w_\gamma/2}^{w_\gamma/2} \Psi_g(u, v) \mu(\Gamma(i - uw, j - vw))}{\sum_{u=-w_\gamma/2}^{w_\gamma/2} \sum_{v=-w_\gamma/2}^{w_\gamma/2} \Psi_g(u, v) \delta(\Gamma(i - uw, j - vw))} \quad \text{(EQN. 10)}$$

where $$\mu(x) = \begin{cases} 0 & \text{if } x \leq 0 \\ x & \text{otherwise;} \end{cases}$$

$$\delta(x) = \begin{cases} 0 & \text{if } x \leq 0 \\ 1 & \text{otherwise;} \end{cases}$$

$\Psi_g$ is a bi-orthogonal kernel; and $w_\gamma$ is the kernel size.

Because of the scalable nature of the wavelets, $\Gamma(i, j)$ is also scalable. For the blocks of the fingerprint image where inter-ridge distance hardly changes, the analysis results in high energy in the LL bands, the coarsest level of the pyramids, and can be ignored during synthesis of the wavelet pyramid.

Statistical analysis of local ridge frequencies allows determination of features including, but not limited to, the following:

ridge mean ($\mu_r$);
ridge median ($M_r$);
ridge variance ($\gamma_r$); and
ridge standard deviation ($\sigma_r$).

The fingerprint image may contain many artifacts, and hence orientation fields, generated from the fingerprint images that can not be directly used. Ridge reliability can be calculated using alignment of the ridge with the other adjacent ridges and the length of the connected ridge segments.

Figure 3:
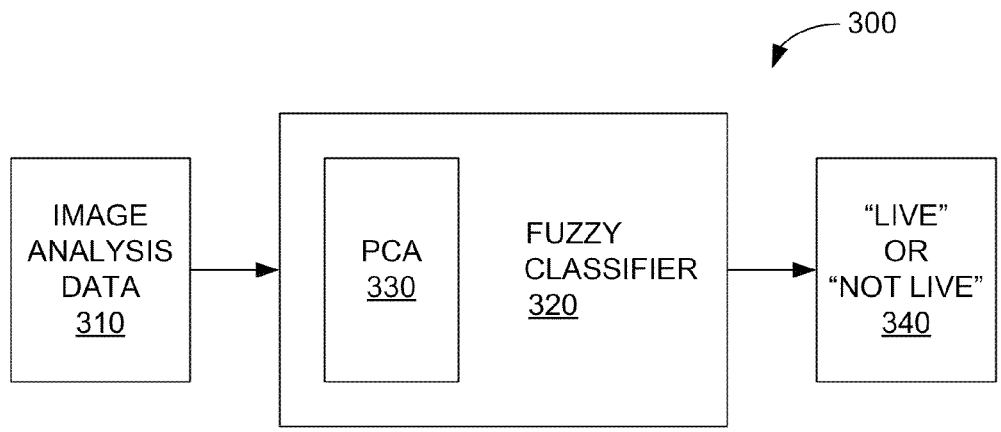
FIG. 3 is an illustration of a classifier to determine liveness of a fingerprint image such as those illustrated in FIG. 1 according to an embodiment of the present invention.

FIG. 3 is an illustration of a classifier to determine liveness of a fingerprint image such as those illustrated in FIG. 1 according to an embodiment of the present invention. Image analysis data 310 is submitted to fuzzy classifier 320. Image analysis data 310 can include, but is not limited to, data derived through multi-resolution texture analysis and/or local-ridge frequency analysis. Data 310 can include, but is not limited to, first order features such as energy, entropy, median, variance, skewness, and Kurtosis; second order features such as cluster shade and cluster prominence; local-ridge data such as ridge mean, ridge median, ridge variance, ridge standard deviation, and ridge reliability.

Image analysis data 310 is initially condensed. Condensation can include, but is not limited to, reduction in the dimension of the data space, filtering of the data, and reducing the data for presentation to a classifier. In the embodiment of FIG. 3, the image analysis data 310 is initially processed using principal component analysis (PCA) 330. Principal component analysis is a technique used to reduce multidimensional data sets to lower dimensions for analysis. PCA is mathematically defined as an orthogonal linear transformation that transforms the data to a new coordinate system such that the greatest variance by any projection of the data comes to lie on the first principal component, the second greatest variance on the second coordinate, and so on. PCA can be used for dimensionality reduction in a data set by retaining those characteristics of the data set that contribute most to its variance by keeping lower-order principal components while eliminating higher-order components.

PCA 330 is used to condense the submitted multidimensional data sets for analysis by reducing the data set dimension. Other methods that may also be used to reduce the data submitted to the fuzzy classifier include, but are not limited to, neural networks, classification trees, selection of most statistically different features, and modification trees. Training of the PCA 330, or other reduction methods, is facilitated by a set of known training data.

The reduced feature set is provided to the fuzzy classifier 320. The reduced set is analyzed by the fuzzy classifier 320 to determine liveness 340 of the fingerprint image. In the current embodiment, fuzzy c-means clustering is utilized. Other classification methods including, but not limited to, neural networks, nearest neighbor classifiers, support vector machines, and classification trees may also be used to determine liveness 340. After the analysis is complete, classifier 320 indicates if the fingerprint image is "live" or "not live" 330.

Fuzzy c-means clustering (FCM) differs from hard k-means in that it does not employ a hard threshold. Instead, FCM employs fuzzy partitioning such that a data point can belong to some or all groups with different membership grades between 0 and 1. This improves the sensitivity of the liveness detection. An iterative training approach to find cluster centers (i.e., centroids) that minimize a dissimilarity function may be adopted.

The dissimilarity function is given as:

$$J(U, c_1, c_2, \ldots, c_c) = \sum_{i=1}^{c} J_i = \sum_{i=1}^{c} \sum_{j=1}^{n} u_{ij}^m d_{ij}^2 \quad \text{(EQN. 11)}$$

where, U is the membership matrix, $c_i$ is the centroid of cluster i, $u_{ij}$ is a membership grade between 0 and 1, $d_{ij}$ is the Euclidean distance between the $i^{th}$ centroid ($c_i$) and the $j^{th}$ data point ($x_j$), and $m \in [1, \infty]$ is a weighting exponent. The membership matrix (U) is randomly initialized using:

$$\sum_{i=1}^{c} u_{ij} = 1, \forall j = 1, \ldots, n. \quad \text{(EQN. 12)}$$

The following conditions are used to iteratively minimize the dissimilarity function. One skilled in the art would understand that other minimization methods could also be used. First, the centroids ($c_i$) are calculated using:

$$c_i = \frac{\sum_{j=1}^{n} u_{ij}^m x_j}{\sum_{j=1}^{n} u_{ij}^m}. \quad \text{(EQN. 13)}$$

The membership grade for each data point is then updated using:

$$u_{ij} = \frac{1}{\sum_{k=1}^{c} \frac{d_{ij}^{2/(m-1)}}{d_{kj}}}. \quad \text{(EQN. 14)}$$

By iteratively updating the cluster centers and the membership grades for each data point, FCM iteratively moves the cluster centers within data set. Dissimilarity between two clusters is calculated using EQN. 11. The iterative training process is stopped when the difference between the current dissimilarity and the previous dissimilarity is below a threshold. The threshold my be a fixed predefined value or vary over the iteration process.

After training is completed, liveness can be determined based upon calculated distance to the cluster centroid of each classification. Image analysis data 310 (FIG. 3) from a new fingerprint image is submitted to the classifier 320 where the data is reduced by PCA 330. The distance to the "live" and "not live" cluster centroids is then determined. The fingerprint liveness 340 is associated with the closest cluster centroid. In other embodiments, liveness may be associated with the cluster with the highest probability of membership. A minimum probability threshold may be used to ensure reliability of the classification. In another embodiment, liveness is determined based upon image data being within a predetermined cluster contour.

Figure 4:
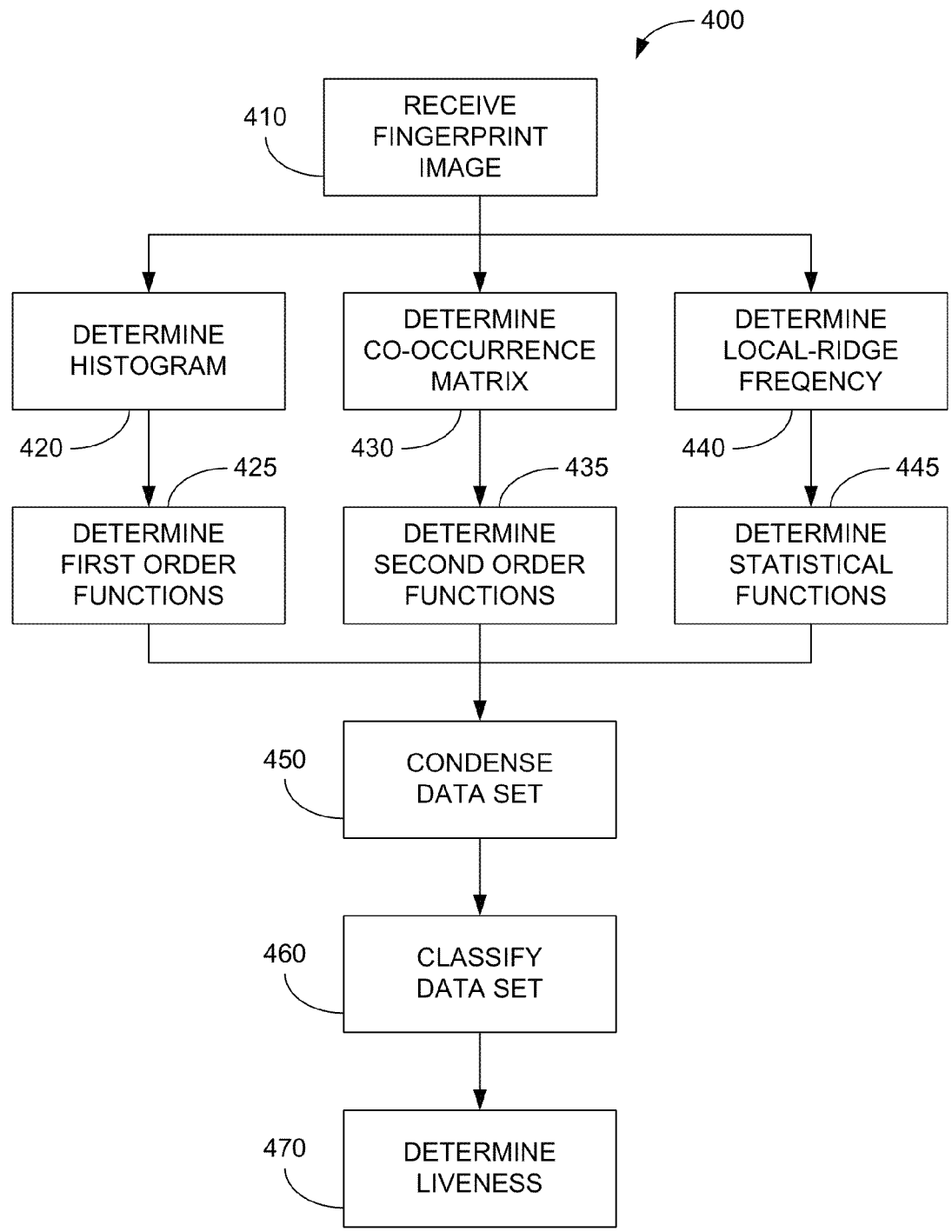
FIG. 4 is a flow chart that provides one example of the operation of a system to determine liveness of fingerprint images such as those illustrated in FIG. 1 according to an embodiment of the present invention.

Referring next to FIG. 4, shown is a flow chart 400 that provides one example of the operation of a system to determine liveness of fingerprint images such as those illustrated in FIG. 1 according to an embodiment of the present invention. Alternatively, the flow chart of FIG. 4 may be viewed as depicting steps of an example of a method implemented in a processor system 500 (FIG. 5) to determine liveness of fingerprint images as set forth above. The functionality of the fingerprint liveness detection as depicted by the example flow chart of FIG. 4 may be implemented, for example, in an object oriented design or in some other programming architecture. Assuming the functionality is implemented in an object oriented design, then each block represents functionality that may be implemented in one or more methods that are encapsulated in one or more objects. The fingerprint liveness detection may be implemented using any one of a number of programming languages such as, for example, C, C++, or other programming languages.

Beginning with block 410, a fingerprint image is received. Functions related to the received image are determined using one or more methods such as, but not limited to, multi-resolution texture analysis and local-ridge frequency analysis techniques.

Multi-resolution texture analysis techniques utilize the grayscale of the fingerprint image to develop multi-resolution texture analysis data including, but not limited to, first and/or second order features related to the image. A histogram of the grayscale distribution of the image pixels is determined in block 420. In block 425, the histogram can be used to determine first order functions of the image including, but not limited to, energy, entropy, median, variance, skewness, and Kurtosis. Second order functions of the image may also be determined (block 435) based upon a co-occurrence matrix determined in block 430. Second order functions can include, but are not limited to, cluster shade and cluster prominence. Higher order functions may also be utilized to determine liveness.

Local-ridge frequency analysis determines local-ridge frequency data (block 440) for each block of the fingerprint image. Statistical functions are determined in block 445 from the local-ridge data. The statistical functions (or data) can include, but are not limited to, ridge mean, ridge median, ridge variance, ridge standard deviation. Ridge reliability can also be determined from the local-ridge information.

The analysis data determined from the fingerprint image may be condensed in block 450. Condensation can include, but is not limited to, reduction in the dimension of the data space, filtering of the data, and reducing the data for presentation to a classifier. Principal component analysis (PCA), neural networks, and modification trees can be used to reduce the submitted data set for classification. In one embodiment, among others, PCA reduces the multidimensional analysis data set to lower dimensions by keeping lower-order principal components while eliminating higher-order components. One skilled in the art would understand that condensation of a limited data set may not be necessary for classification. The condensed data set is classified using a fuzzy classifier in block 460 and liveness of the fingerprint image is determined in block 470 based upon proximity to a classification cluster centroid.

Figure 5:
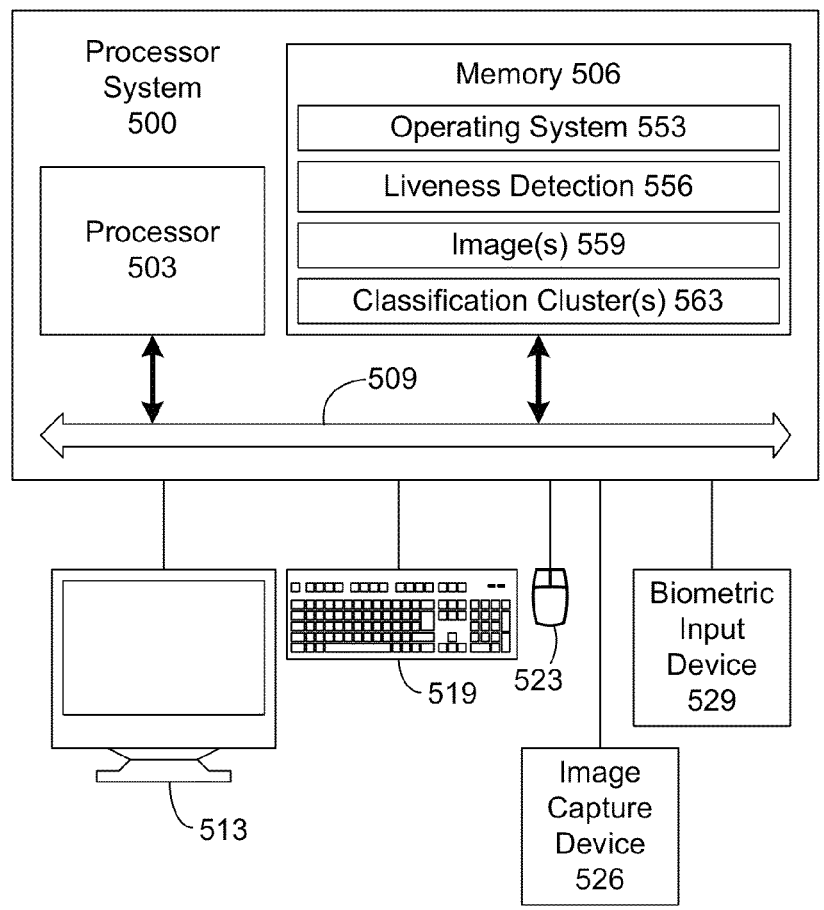
FIG. 5 is a schematic block diagram of one example of a system employed to detect fingerprint liveness and to perform various analysis with respect to the fingerprint liveness detection according to an embodiment of the present invention.

Referring next to FIG. 5, shown is one example of a system that performs various functions using fingerprint liveness detection according to the various embodiments as set forth above. As shown, a processor system 500 is provided that includes a processor 503 and a memory 506, both of which are coupled to a local interface 509. The local interface 509 may be, for example, a data bus with an accompanying control/address bus as can be appreciated by those with ordinary skill in the art. The processor system 500 may comprise, for example, a computer system such as a server, desktop computer, laptop, personal digital assistant, or other system with like capability.

Coupled to the processor system 500 are various peripheral devices such as, for example, a display device 513, a keyboard 519, and a mouse 523. In addition, other peripheral devices that allow for the capture of various patterns may be coupled to the processor system 500 such as, for example, an image capture device 526 or a biometric input device 529. The image capture device 526 may comprise, for example, a digital camera or other such device that generates images that comprise patterns to be analyzed as described above. Also, the biometric input device 529 may comprise, for example, a fingerprint input device, optical scanner, or other biometric device 529 as can be appreciated.

Stored in the memory 506 and executed by the processor 503 are various components that provide various functionality according to the various embodiments of the present invention. In the example embodiment shown, stored in the memory 506 is an operating system 553 and a fingerprint liveness detection system 556. In addition, stored in the memory 506 are various images 559 and various classification clusters 563. The classification clusters 563 may be associated with a corresponding image capture device 526 or biometric input device 529. The images 559 and the classification clusters 563 may be stored in a database to be accessed by the other systems as needed. The images 559 may comprise fingerprints such as the images in FIG. 1 or other patterns as can be appreciated. The images 559 comprise, for example, a digital representation of physical patterns or digital information such as data, etc.

The fingerprint liveness detection system 556 is executed by the processor 503 in order to classify whether a fingerprint image is "live" or "not live" as described above. A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, or source code that may be expressed in proper format such as object code that is capable of being loaded into a of random access portion of the memory 506 and executed by the processor 503, etc. An executable program may be stored in any portion or component of the memory 506 including, for example, random access memory, read-only memory, a hard drive, compact disk (CD), floppy disk, or other memory components.

The memory 506 is defined herein as both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

The processor 503 may represent multiple processors and the memory 506 may represent multiple memories that operate in parallel. In such a case, the local interface 509 may be an appropriate network that facilitates communication between any two of the multiple processors, between any processor and any one of the memories, or between any two of the memories etc. The processor 503 may be of electrical, optical, or molecular construction, or of some other construction as can be appreciated by those with ordinary skill in the art.

The operating system 553 is executed to control the allocation and usage of hardware resources such as the memory, processing time and peripheral devices in the processor system 500. In this manner, the operating system 553 serves as the foundation on which applications depend as is generally known by those with ordinary skill in the art.

Experimental Validation

A previously collected data set was used to confirm the disclosed identification process. This data set was diverse in age, sex, and ethnicity by being composed of a variety of age and ethnic groups and approximately equal numbers of men and women. The data was collected using three different fingerprint scanners, with different underlying technologies, Secugen (model FDU01), Ethentica (model Ethenticator USB 2500) and Precise Biometrics (model PS100), which utilize optical, electro-optical and capacitive DC techniques of capturing fingerprint images, respectively.

To provide synthetic fingerprint images, a cast was made from each live subject using dental material. Synthetic digits were created from Play-Doh using the procedure given in "Determination of vitality from a non-invasive biomedical measurement for use in fingerprint scanners," R. Derakshani, S. Schuckers, L. Hornak, and L. Gorman, *Pattern Recognition Journal*, vol. 36, no. 2, 2003, which is hereby incorporated by reference in its entirety. Images from cadaver subjects were collected in collaboration with MUSCULOSKELETAL Research Center at West Virginia University (WVU). Protocols for data collection from the subjects were followed that were approved by the West Virginia University Institutional Review Board (IRB) (HS#14517 and HS#15322).

The data set consisted of 130 to 136 fingerprints from live, synthetic, and cadaver sources, depending on the scanner used. TABLE 1 summarizes the available data. Differences in the number of images per scanner were caused by inclusion criteria, which require an accepted enrollment image within five tries. Image collection was performed using custom software developed from device software development kits. The process was implemented using MATLAB.

TABLE 1

|  | Capacitive DC (Precise Biometric) | Electro-Optical (Ethentica) | Optical (Secugen) |
| --- | --- | --- | --- |
| Live | 58 | 55 | 58 |
| Synthetic | 50 | 50 | 52 |
| Cadaver | 33 | 22 | 28 |

Training of the PCA and FCM was performed separately for all the three scanners. A total of 35 live and 35 synthetic images were used for training. In addition, the number of cadaver images used for training were 15, 12 and 15 from Precise Biometrics, Ethentica and Secugen, respectively.

Figure 6:
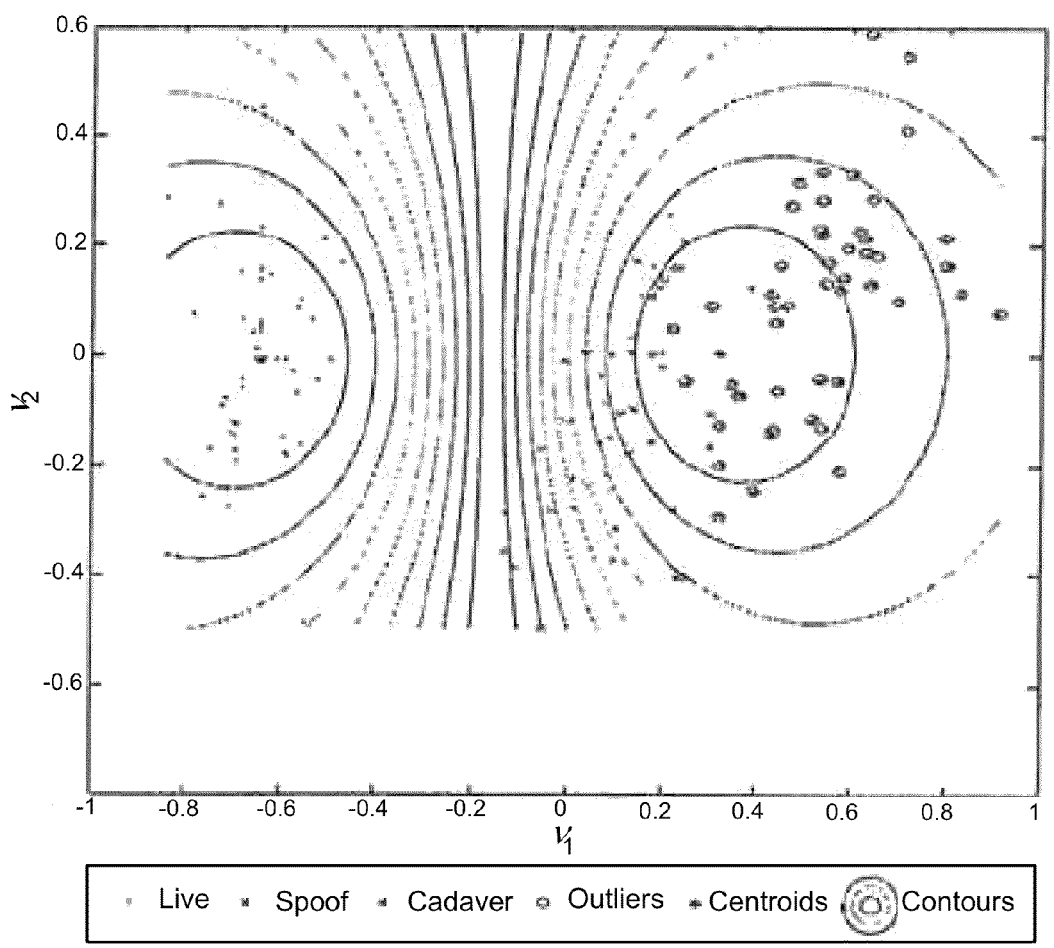
FIG. 6 is a graphical representation of fuzzy clusters resulting from training with data derived from fingerprint images such as those illustrated in FIG. 1 according to an embodiment of the present invention.

FIG. 6 is a graphical representation of fuzzy clusters resulting from training with data derived from fingerprint images such as those illustrated in FIG. 1 according to an embodiment of the present invention. The training data, cluster centroids and contours were plotted on the plane formed by the first two principle components using a non-linear sammom mapping. The cluster on the left (i.e., negative values) includes "live" data while the cluster on the right side (i.e., positive values) includes "not live" data.

The remaining fingerprint images were used to confirm the process. Image analysis data 310 (FIG. 3) was determined for each fingerprint image using multi-resolution texture analysis, local-ridge frequency analysis, and ridge reliability. Image analysis data 310 received by the trained classifier 320 included first order features such as energy, entropy, median, variance, skewness, and Kurtosis; second order features such as cluster shade and cluster prominence; local ridge data such as ridge mean, ridge median, ridge variance, ridge standard deviation, and ridge reliability. The submitted data 310 was processed by the PCA 330 and fuzzy classifier 320. Classification 340 was based upon distance to the closest cluster centroid. Using this method, classification rates of 97.3%, 96.5% and 92.3% were achieved using the process for Secugen, Precise Biometrics and Ethentica, respectively.

Intensity Analysis

Figure 7:
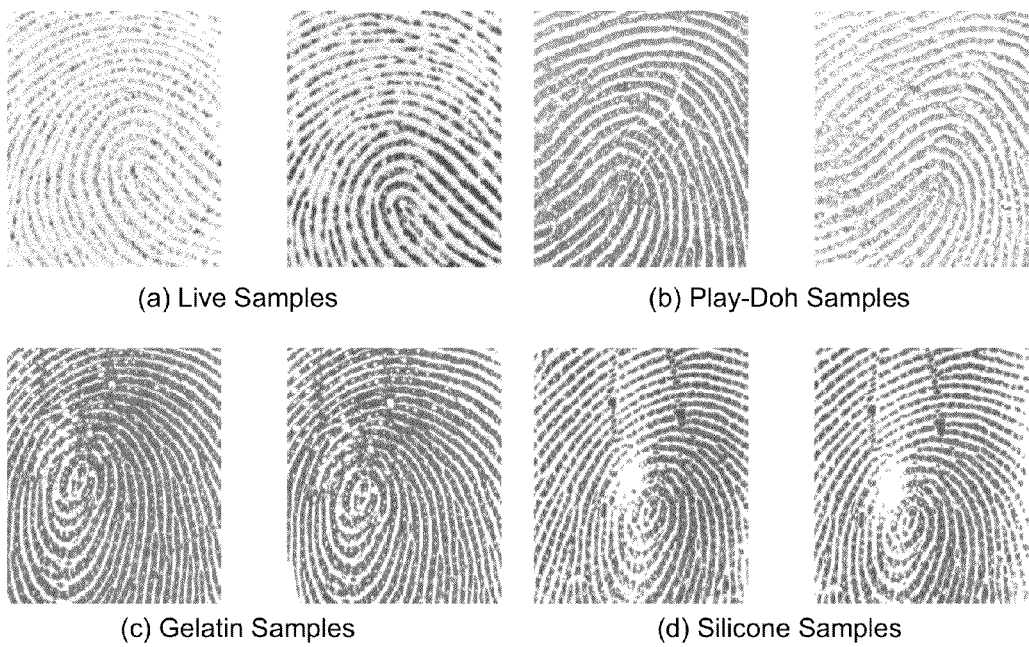
FIG. 7 is an illustration of live and synthetic fingerprint images obtained using an optical scanner according to an embodiment of the present invention.

One embodiment, among others, of liveness detection comprises classification analysis based upon features of fingerprint image intensity variation caused by moisture variability and differences between human skin and synthetic materials such as Play-Doh, gelatin and silicone. FIG. 7 is an illustration of live and synthetic (i.e., Play-Doh, gelatin, and silicone) fingerprint images obtained using an optical scanner according to an embodiment of the present invention. As can be observed, intensity and uniformity of the live and synthetic images vary based upon the source.

A captured fingerprint image may also be affected by cleanliness of either the scanner surface (e.g., latent fingerprint impressions deposited on the surface) or the fingerprint itself. A median filter can be used to remove this kind of noise from the scanned image.

To improve the classification process, a region of interest (ROI) may be isolated for further processing. To determine the ROI, the whole image is initially divided into blocks of small size (e.g., 16×16 pixels) and the variance of each block is computed. In one embodiment, variation in intensity of pixels within a block is computed. Other variations can include, but are not limited to, the ratio of light to dark pixels based upon a predefined threshold. If the variance of a block is less than a threshold value, then the block is removed from original image. This is continued until each block has been evaluated. Next, the center of the fingerprint image is determined. The fingerprint foreground is segmented and the total area calculated. One segmentation method is described in "Fingerprint Image Enhancement: Algorithm and Performance Evaluation," L. Hong, Y. Wang, and A. Jian, *IEEE Trans. on Pattern Analysis and Machine Intelligence*, vol. 20, no. 8, pp. 777-789, August 1998, which is hereby incorporated by reference in its entirety. Then, the accumulative row numbers and column numbers are averaged by the total area to get a center point of the image. Other appropriate methods for determining an image center may also be used. Finally, the ROI is extracted from the processed image by cropping a predefined area (e.g., 100×100 square area) around the center of the fingerprint. Other areas can include, but are not limited to, rectangles, hexagons and octagons.

Figure 8:
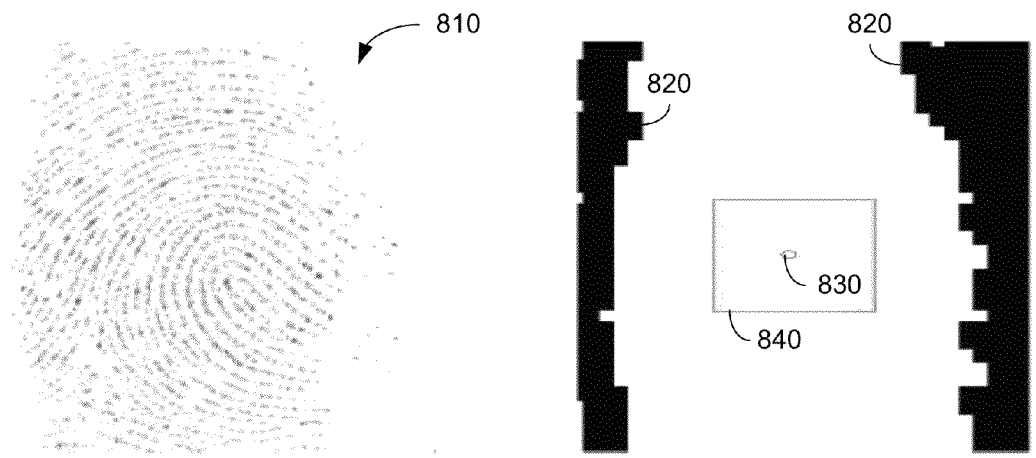
FIG. 8 illustrates Region of Interest (ROI) processing of a live image from FIG. 7 according to an embodiment of the present invention.

FIG. 8 illustrates ROI processing of a live image from FIG. 7 according to an embodiment of the present invention. The initial fingerprint image 810 is shown on the left. The processing image is illustrated on the right. Blocks that did not meet the variance threshold 820 have been removed (i.e., blacked out) on the edges of the processed image. The center of the fingerprint 830 was determined and the selected area 840 about center 830 is extracted. The center portion 840 of the fingerprint image 810 is selected to allow for reduced data processing while providing sufficient information to detect the liveness of the image.

After extracting the centered ROI, intensity of the fingerprint is compared using histogram distribution analysis. The histogram of an image indicates the number of pixels in an image at each different intensity (or grayscale) value. For an 8-bit grayscale image, there are 256 different possible intensities (i.e., 0-255, where 0 is black and 255 is white). Other grayscales (e.g., 16- or 32-bit) or color scales may be utilized.

Thus, the associated histogram will graphically display the distribution of pixels among those grayscale values.

If H(i) indicates the histogram distribution function along the grayscale levels, the following statistical features are used to quantify the difference between the extracted images:

$$A = \frac{\sum_{i=0}^{120} H(i)}{\sum_{i=0}^{255} H(i)};$$ (EQN. 15)

$$B = \frac{\sum_{i=230}^{244} H(i)}{\sum_{i=0}^{255} H(i)}; \text{ and}$$ (EQN. 16)

$$C = \frac{\sum_{i=250}^{255} H(i)}{\sum_{i=0}^{255} H(i)}.$$ (EQN. 17)

Feature A is used to quantify the percentage of pixels that are distributed within the dark levels. Feature B is used to quantify the percentage of pixels that are distributed within the white levels, but not the whitest level. Feature C is used to quantify the percentage of pixels that are distributed at the whitest levels.

After the statistical features (A, B, C) are extracted, pattern classification tools such as, but not limited to, neural networks, nearest neighbor analysis, support vector machines, and classification (or decision) trees are used to separate the "not live" subjects including synthetic fingers from the "live" subjects.

Neural networks are pattern classification methods for non-linear problems. Multilayer perceptrons (MLPs) are feed forward neural networks trained with the standard back-propagation algorithm. Supervised networks are trained to transform data into a desired response. The multilayer perceptron is capable of learning a rich variety of nonlinear decision surfaces. In one embodiment, a two-layer feed-forward network can be created where the inputs are the extracted statistical features (A, B, C). The first hidden layer uses three tansig neurons and the second layer has one purelin neuron. The "trainlm" network training function is used. For convenience of training, bipolar targets (+1 and −1) are chosen to denote "live" and "not live" categories, respectively. One skilled in the art would understand that other types of neural networks could be utilized.

Nearest Neighbor classifier is another supervised statistical pattern recognition method which can be used. Nearest Neighbor classifiers are described in "Instance-based learning algorithms," D. Aha and D. Kibler, *Machine Learning*, vol. 6, pp. 37-66, 1991, which is hereby incorporated by reference in its entirety. This classifier achieves consistently high performance without a priori assumptions about the distributions from which the training examples are drawn. It utilizes a training set of both positive and negative cases. A new sample is classified by calculating the normalized Euclidean distance to the nearest training case.

Classification trees may also be utilized to classify the image. Classification trees derive a sequence of if-then-else rules using a training data set in order to assign a class label to the input data. The user can view the decision rules to verify that the rules match their understanding of the classification.

Several learning and searching strategies are utilized to train the models including, but not limited to, ADTree, J48, Random Forest, and Bagging Tree. ADTree classification is described in "The alternating decision tree learning algorithm," Y. Freund and L. Mason, *Proceeding of the Sixteenth International Conference on Machine Learning*, Bled, Slovenia, pp. 124-133, 1999, which is hereby incorporated by reference in its entirety. J48 classification is described in *C4.5: Programs for Machine Learning*, R. Quinlan, 1993, which is hereby incorporated by reference in its entirety. Random Forest classification is described in "Random Forests," L. Breiman, *Machine Learning*, 45(1):5-32, 2001, which is hereby incorporated by reference in its entirety. Bagging Tree classification is described in "Bagging Predictors," L. Breiman, *Machine Learning*, 24(2):123-140, 1996, which is hereby incorporated by reference in its entirety.

A support vector machine (SVM) may also be used to make the classification. Support vector machines are described in *Fast Training of Support Vector Machines using Sequential Minimal Optimization*, J. Platt, Chap. 12: Advances in Kernel Methods—Support Vector Learning, pp. 185-208, 1999, which is hereby incorporated by reference in its entirety. Support vector machines are a set of related supervised learning methods used for classification. SVMs simultaneously minimize the empirical classification error and maximize the geometric margin; hence they are also known as maximum margin classifiers. SVMs map input vectors to a higher dimensional space where a maximal separating hyperplane is constructed. Two parallel hyperplanes are constructed on each side of the hyperplane that separates the data. The separating hyperplane is the hyperplane that maximizes the distance between the two parallel hyperplanes. The larger the margin or distance between these parallel hyperplanes, the better the generalization error of the classifier will be. Classification of new input data is based upon which plane it is mapped to.

Figure 9:
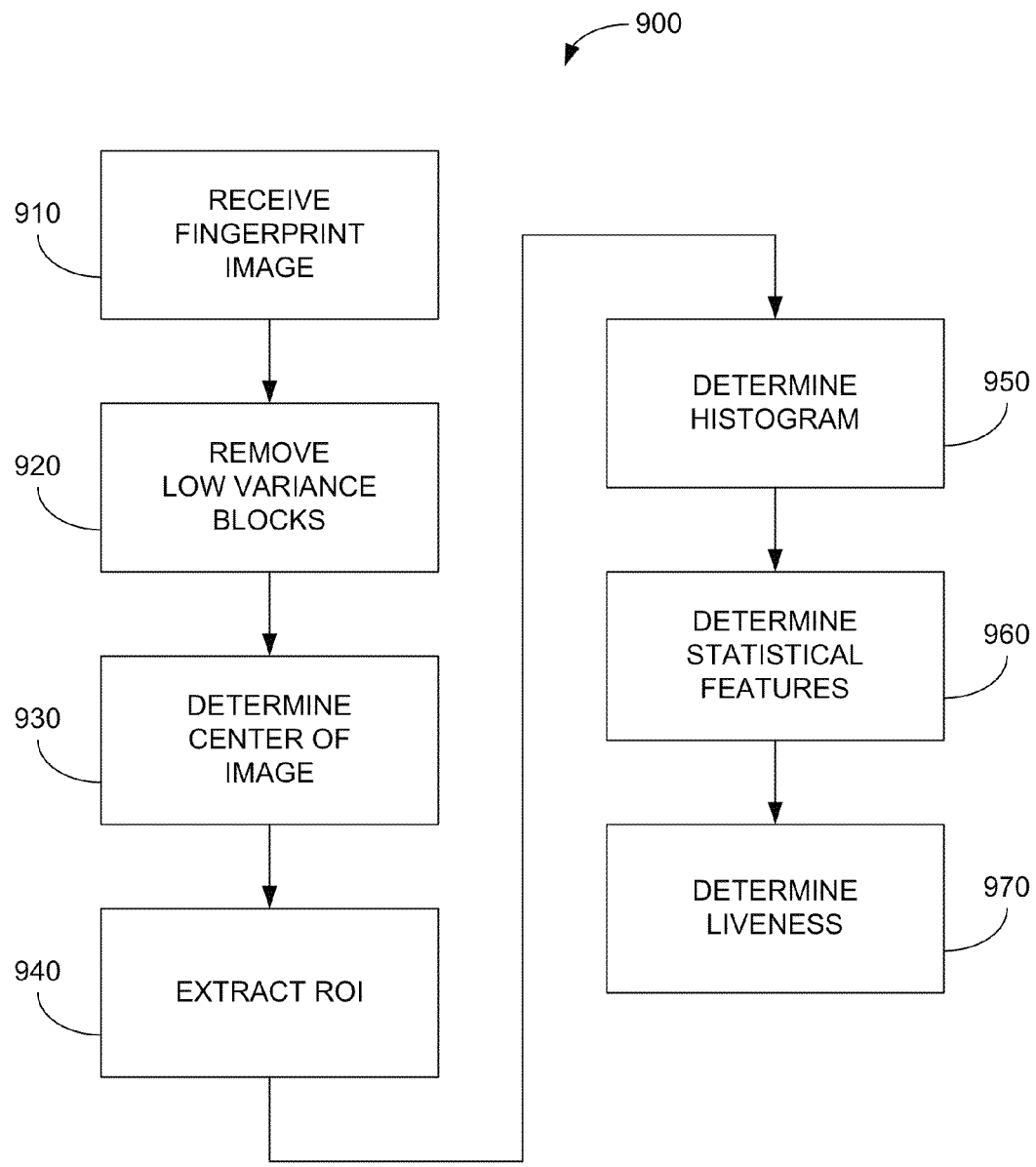
FIG. 9 is a flow chart 900 that provides one example of the operation of a system to determine liveness of fingerprint images, such as those illustrated in FIG. 7, utilizing ROI processing according to an embodiment of the present invention.

Referring next to FIG. 9, shown is a flow chart 900 that provides one example of the operation of a system to determine liveness of fingerprint images, such as those illustrated in FIG. 7, utilizing ROI processing according to an embodiment of the present invention. Alternatively, the flow chart of FIG. 9 may be viewed as depicting steps of an example of a method implemented in a processor system 1000 (FIG. 10) to determine liveness of fingerprint images as set forth above. The functionality of the fingerprint liveness detection as depicted by the example flow chart of FIG. 9 may be implemented, for example, in an object oriented design or in some other programming architecture. Assuming the functionality is implemented in an object oriented design, then each block represents functionality that may be implemented in one or more methods that are encapsulated in one or more objects. The fingerprint liveness detection may be implemented using any one of a number of programming languages such as, for example, C, C++, or other programming languages.

Beginning with block 910, a fingerprint image is received. In block 920, the image is initially processed by removing sections (or blocks) of the image that exhibit variance below a threshold value. The center of the reduced image is then determined in block 930 and a ROI about the center of the image is extracted in block 940. The ROI may be a predefined area or may be determined based upon reduced image area, pixel density, or other appropriate means.

In block 950, a histogram is determined from the extracted ROI. Statistical features, such as, but not limited to, A, B, and C listed in EQNS. 15-17, are determined from the histogram distribution (block 960). One skilled in the art would understand that other features derived from the histogram may also be utilized. The statistical features are used to determine the liveness of the image in block 970 using pattern classification tools including, but not limited to, neural networks, nearest neighbor classifiers, classification trees, and support vector machines.

Figure 10:
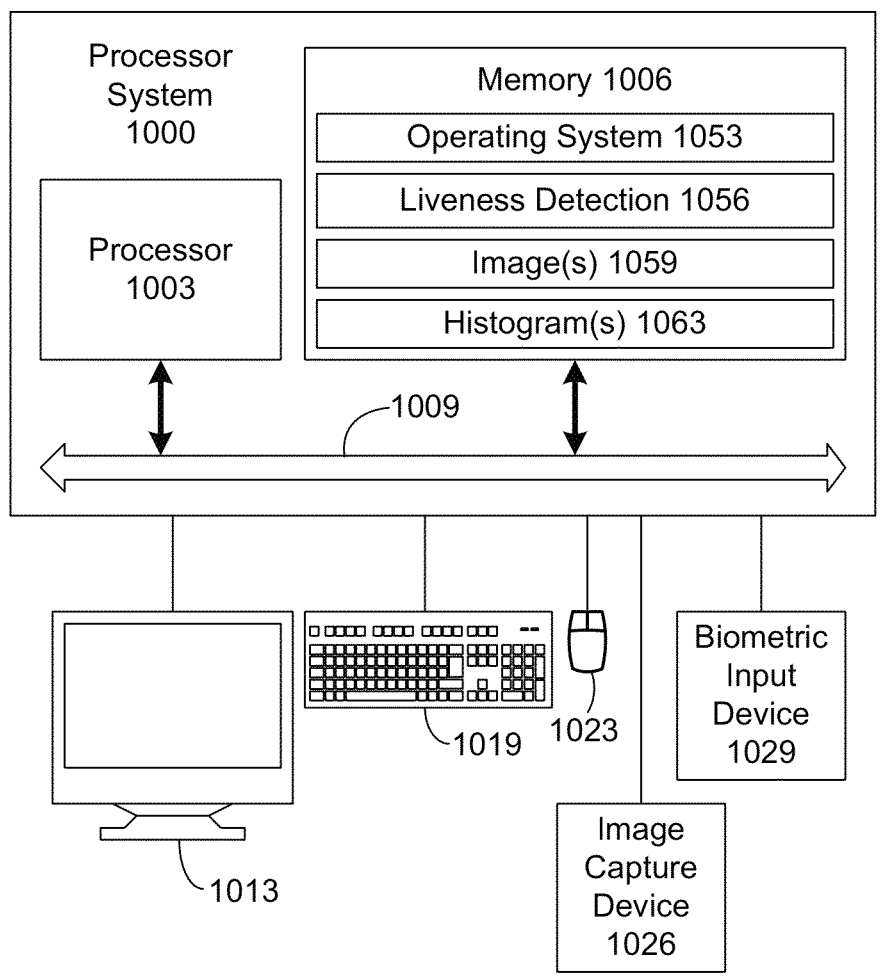
FIG. 10 is a schematic block diagram of one example of a system employed to detect fingerprint liveness and to perform various analysis with respect to the fingerprint liveness detection according to an embodiment of the present invention.

Referring next to FIG. 10, shown is one example of a system that performs various functions using fingerprint liveness detection according to the various embodiments as set forth above. As shown, a processor system 1000 is provided that includes a processor 1003 and a memory 1006, both of which are coupled to a local interface 1009. The local interface 1009 may be, for example, a data bus with an accompanying control/address bus as can be appreciated by those with ordinary skill in the art. The processor system 1000 may comprise, for example, a computer system such as a server, desktop computer, laptop, personal digital assistant, or other system with like capability.

Coupled to the processor system 1000 are various peripheral devices such as, for example, a display device 1013, a keyboard 1019, and a mouse 1023. In addition, other peripheral devices that allow for the capture of various patterns may be coupled to the processor system 1000 such as, for example, an image capture device 1026 or a biometric input device 1029. The image capture device 1026 may comprise, for example, a digital camera or other such device that generates images that comprise patterns to be analyzed as described above. Also, the biometric input device 1029 may comprise, for example, a fingerprint input device, optical scanner, or other biometric device 1029 as can be appreciated.

Stored in the memory 1006 and executed by the processor 1003 are various components that provide various functionality according to the various embodiments of the present invention. In the example embodiment shown, stored in the memory 1006 is an operating system 1053 and a fingerprint liveness detection system 1056. In addition, stored in the memory 1006 are various images 1059 and various histograms 1063. The histograms 1063 may be associated with corresponding ones of the various images 1059. The images 1059 and the histograms 1063 may be stored in a database to be accessed by the other systems as needed. The images 1059 may comprise fingerprints such as the images in FIG. 7 or other patterns as can be appreciated. The images 1059 comprise, for example, a digital representation of physical patterns or digital information such as data, etc.

The fingerprint liveness detection system 1056 is executed by the processor 1003 in order to classify whether a fingerprint image is "live" or "not live" as described above. A number of software components are stored in the memory 1006 and are executable by the processor 1003. In this respect, the term "executable" means a program file that is in a form that can ultimately be run by the processor 1003. Examples of executable programs may be, for example, a compiled program that can be translated into machine code in a format that can be loaded into a random access portion of the memory 1006 and run by the processor 1003, or source code that may be expressed in proper format such as object code that is capable of being loaded into a of random access portion of the memory 1006 and executed by the processor 1003, etc. An executable program may be stored in any portion or component of the memory 506 including, for example, random access memory, read-only memory, a hard drive, compact disk (CD), floppy disk, or other memory components.

The memory 1006 is defined herein as both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

The processor 1003 may represent multiple processors and the memory 1006 may represent multiple memories that operate in parallel. In such a case, the local interface 1009 may be an appropriate network that facilitates communication between any two of the multiple processors, between any processor and any one of the memories, or between any two of the memories etc. The processor 1003 may be of electrical, optical, or molecular construction, or of some other construction as can be appreciated by those with ordinary skill in the art.

The operating system 1053 is executed to control the allocation and usage of hardware resources such as the memory, processing time and peripheral devices in the processor system 1000. In this manner, the operating system 1053 serves as the foundation on which applications depend as is generally known by those with ordinary skill in the art.

Experimental Validation

Data to confirm the described methodology was collected by an Identix DFR2 100 fingerprint scanner, which uses optical scanner technology. Fingerprint images were collected from live, Play-Doh, gelatin and silicone fingers. Live fingerprints were collected from 81 subjects, representing a wide range of ages (18-50 years), ethnicities (Caucasian, Black, and Asian), and both sexes. Some live subjects provided multiple fingerprint images during independent sessions separated by intervals of at least two weeks. TABLE 2 summarizes the number of subjects and total fingerprints collected using the Identix scanner. Synthetic fingers were created from Play-Doh, gelatin, and silicone using 38 finger casts of live subjects.

TABLE 2

|  | Live | Play-Doh | Gelatin | Silicone |
| --- | --- | --- | --- | --- |
| Subjects | 81 | 38 | 38 | 38 |
| Sessions | 1-13 | 5 | 5 | 5 |
| Total | 644 | 190 | 190 | 190 |

Figure 11:
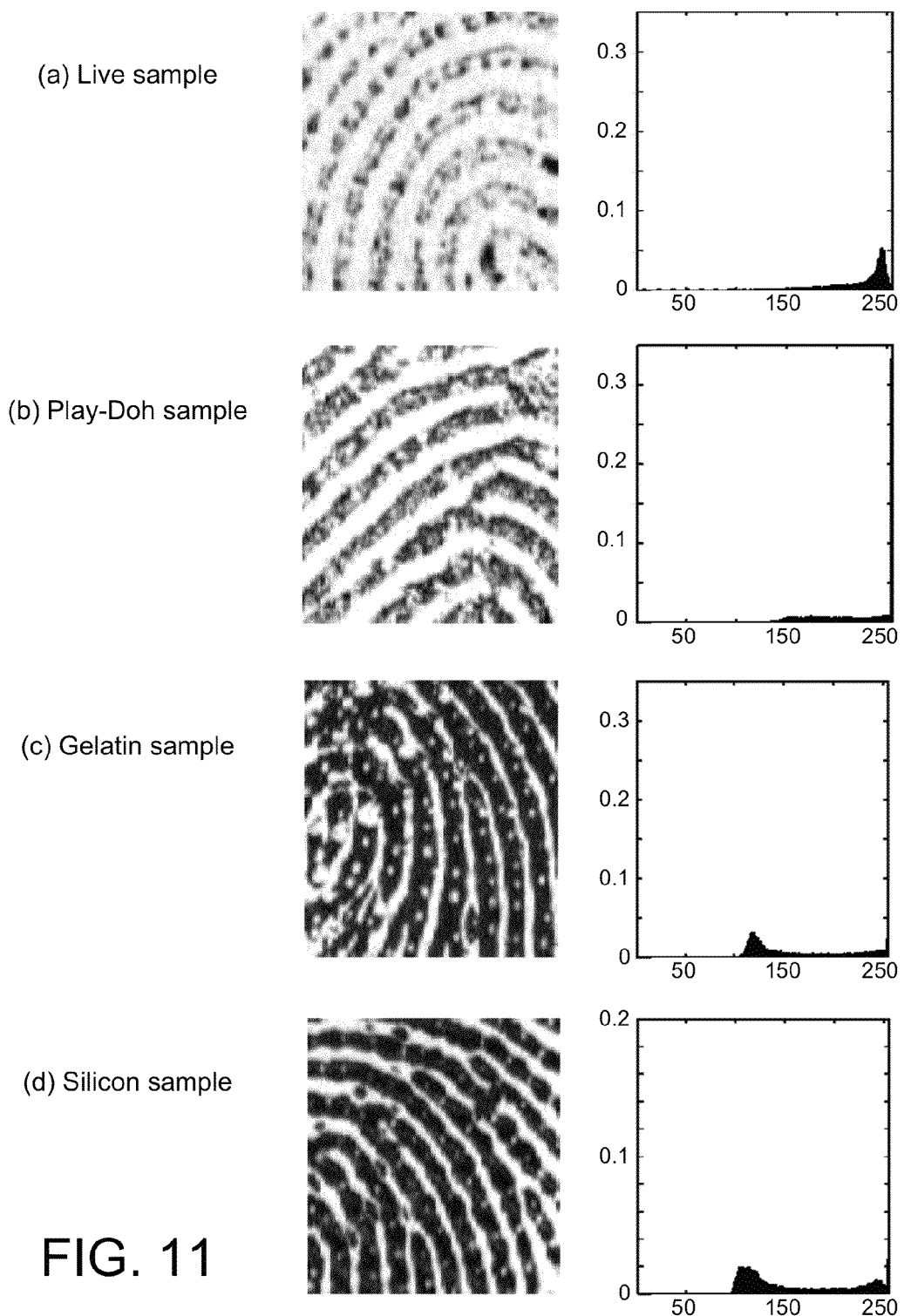
FIG. 11 illustrates typical ROIs of live and synthetic fingerprint images from FIG. 7 and their corresponding intensity histogram distributions according to an embodiment of the present invention.
Figure 12:
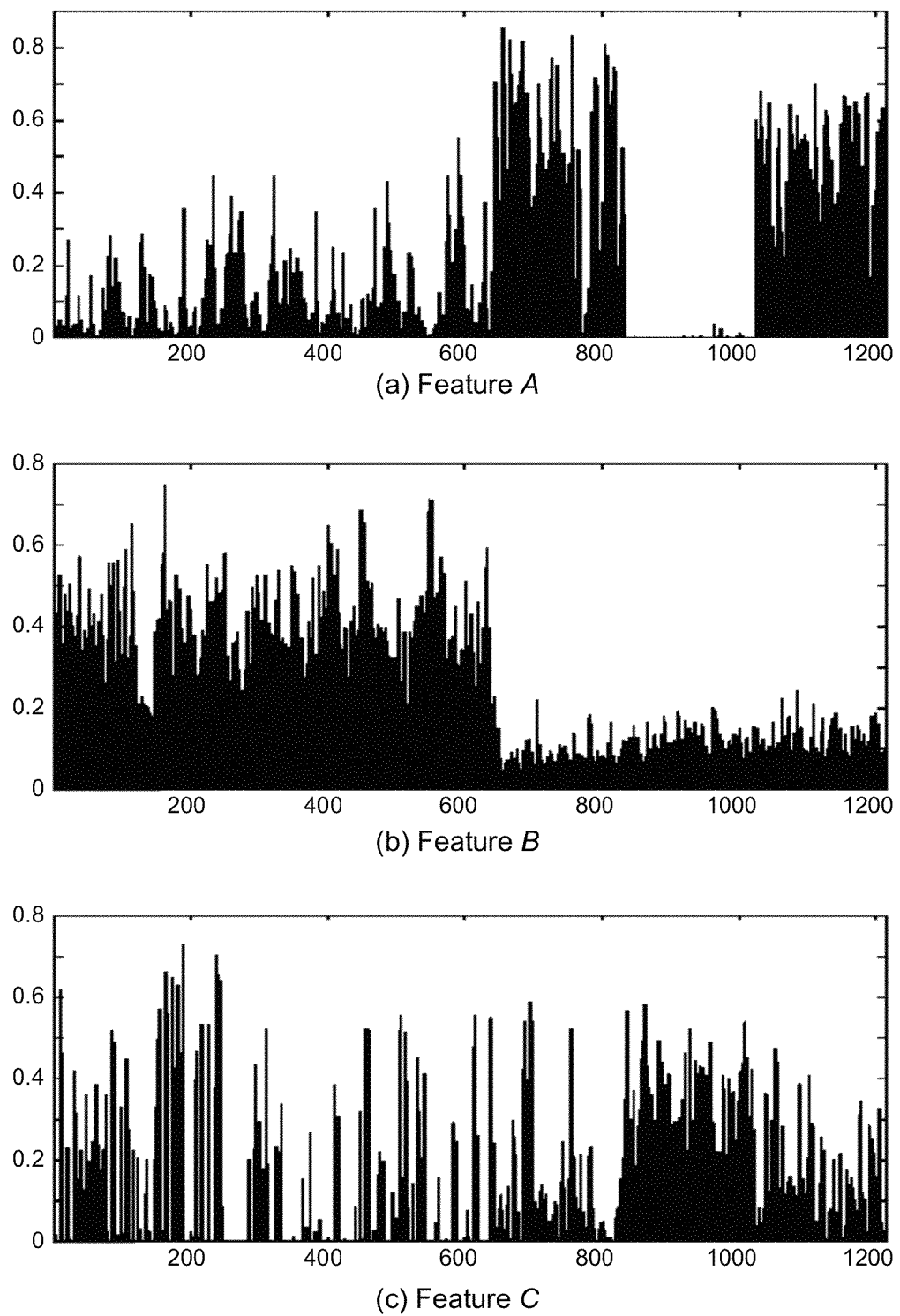
FIG. 12 illustrates the comparison of features derived from the ROI histograms of all live and synthetic fingerprint images according to an embodiment of the present invention.

Each image was processed to extract a ROI, which was used to generate a histogram distribution. FIG. 11 illustrates typical ROIs of live and synthetic fingerprint images from FIG. 7 and their corresponding intensity histogram distributions according to an embodiment of the present invention. Analysis of features A, B, and C was performed on the ROI of each fingerprint image. FIG. 12 illustrates the comparison of features derived from the ROI histograms of all live and synthetic fingerprint images according to an embodiment of the present invention. On the x-axis of each feature set, subjects 1-644 represent live fingers, subjects 645-834 represent Play-Doh fingers, subjects 835-1024 represent gelatin fingers, and subjects 1025-1214 represent silicone fingers. The histogram distribution comparison of FIG. 12 indicates statistical features A, B, and C may be effective for classification of "live" and "not live" fingerprints.

After the statistical features were extracted, pattern classification tools (neural network, nearest neighbor, classification trees, and support vector machine) were used to separate the non-live subjects from the live subjects. Ten-fold cross-validation test was used to test the method. The original sample set is partitioned into ten subsamples of which nine are used as training data and one is used for validation. The cross-validation process is then repeated ten times using different subsample combinations and the results were averaged to produce a single estimation. Implementation with the different classification tools produced equal error rates of between 5-15%. One J48 classification tree produced a recognition rate of 93% for synthetic subjects and 96.54% for live subjects.

Singularity Analysis

One embodiment, among others, of liveness detection comprises classification analysis based upon perspiration phenomena. The physiological phenomenon of perspiration, observed only in live people, is discussed in "Characterization, Similarity Score and Uniqueness Associated with Perspiration Pattern," A. Abhyankar and S. Schuckers, *Lecture Notes in Computer Science*, no. 3546, pp. 301-309, 2005, which is hereby incorporated by reference in its entirety.

Pre-processing of a fingerprint image involves finding the singularity points using wavelets analysis and transforming the information back into the spatial domain to form a "filtered" spatial domain signal. Wavelet analysis of the images can be performed using Daubechies wavelet. Wavelet packet analysis is used to maintain scalable structure of the information content. Singularity points act as "quality check" points. Thus, bad quality and partial cadaver and synthetic images were rejected before further processing when the number of singularity points is below a selected threshold.

If a sufficient number of singularity points are obtained, the spatial domain signal is subjected to Hubert Huang Technique. Wavelet packet sieving is used to tune the modes so as to gain physical significance with reference to the evolving perspiration pattern in "live" fingers. The percentage of the energy contribution in the different modes is used as a quantified measure to differentiate "live" fingers from "not live."

Detection of singularity points in the fingerprint image is performed using wavelet analysis. In one embodiment, a Daubechies wavelet is selected as the mother wavelet. Daubechies wavelets are described in *Ten Lectures on Wavelets*, I. Daubechies, Society of Industrial and Applied Mathematics, 1998, which is hereby incorporated by reference in its entirety. Daubechies wavelets were selected for the following properties:

orthonormality, having finite support;
optimal, compact representation of the original signal from a sub-band coding point of view, which produces a multi-resolution effect;
capability to select maximum vanishing moments and minimum phase, so as to extract even minute details from smoother parts; and
cascade algorithm allowing zoom-in on particular features of a scaling function.

In addition, Daubechies filters can be designed so that the phase of the filter is minimized and the number of vanishing moments is maximized. This allows extraction of changing information even from the smoother parts of an image. One skilled in the art would understand that other wavelets could be used to determine singularities. Other methods to perform time-frequency analysis include, but are not limited to, wavelet packets, Daubechies wavelets, Harr wavelets, and short-time Fourier transforms. Singularity point analysis is discussed in *Wavelets and Their Applications*, M.-B. Ruskai, G. Beylkin, R. Coifman, I. Daubechies, S. Mallat, Y. Meyers, and L. Raphael (eds.), Jones and Bartlett, Boston, pp. 453-471, 1992, which is hereby incorporated by reference in its entirety.

Singularity detection can be undertaken by describing the local regularity of a signal. Localizing ridge information through singularity detection is based upon the time course of a pixel at each location (x, y) being considered a piecewise regular function. Thus, a wavelet transform that identifies singularity points at pixel locations that exist along the temporal dimension yields a sparse representation of the data with most coefficients close to zero. A few large coefficients are obtained at time points where the signal consists of jump-like changes (or singularities) from a baseline to an activation state or vice versa. The ability of the wavelet transform to characterize the local regularity of the ridge functions aids in this approach.

For a fingerprint image, all modulus maxima of the wavelet transform and chain maxima across scales to obtain maxima lines are computed. If the image is noisy, maxima lines due to noise are mostly concentrated at fine scales, whereas maxima lines due to signal changes should be persistent across coarser scales. Mathematically, singularity detection can be carried out by finding the abscissa where the wavelet modulus maxima converge at finer scales.

Three criteria can be used to distinguish singularities caused by noise fluctuations from those that are generated from sharp signal transitions, namely ridge length, ridge orientation strength, and ridge reliability. Only maxima lines that persist across all scales of analysis are considered as true ridge signal transitions, since noise fluctuation should have less persistence in scale-space. In addition, the strength of a ridge maxima line is computed as the sum of the modulus maxima along the line (across scales). This criterion reinforces the first criteria, since longer maxima lines tend to have larger values for their strength, and strong signal variations yield wavelet coefficients with large amplitudes resulting in values of greater magnitude. These criteria essentially filter out noisy and partial images for further analysis.

Figure 13:
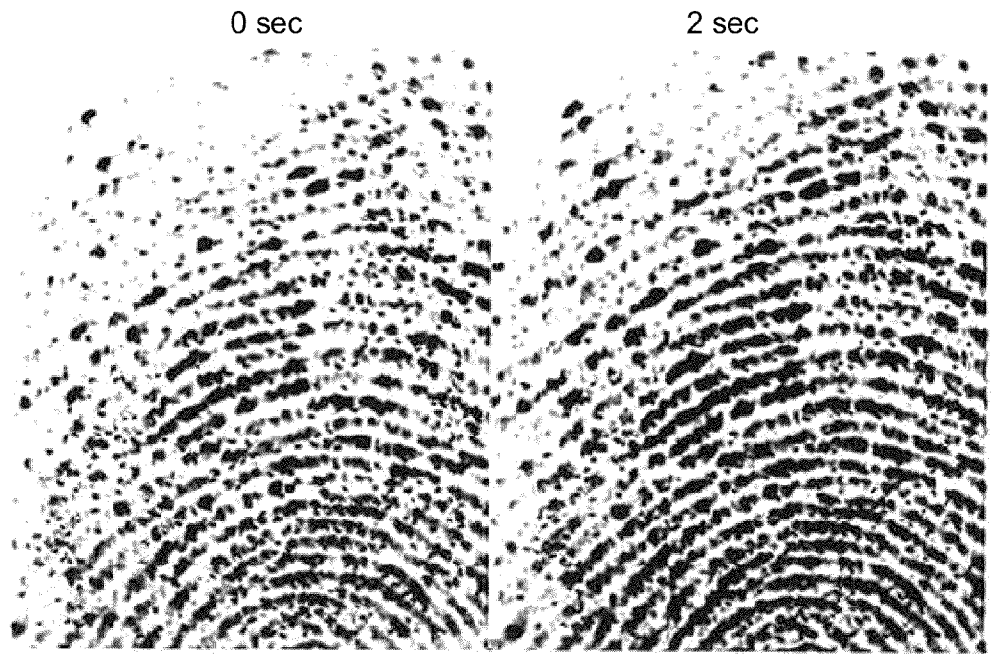
FIG. 13 is an illustration of an initial (0 sec) fingerprint image and a subsequent (2 sec) fingerprint image obtained from a "live" capture according to an embodiment of the present invention.

FIG. 13 is an illustration of an initial (0 sec) fingerprint image and a subsequent (2 sec) fingerprint image obtained from a "live" capture according to an embodiment of the present invention. Singularity points are determined for each of the fingerprint images. TABLE 3 demonstrates the average number of singularity points obtained from initial and subsequent images obtained two seconds apart from a test set of fingerprint images: 58 live, 50 synthetic, and 28 cadaver. The numbers given in TABLE 3 are averaged for each of three scanner technologies: optical, electro-optical and capacitive DC.

Figure 14:
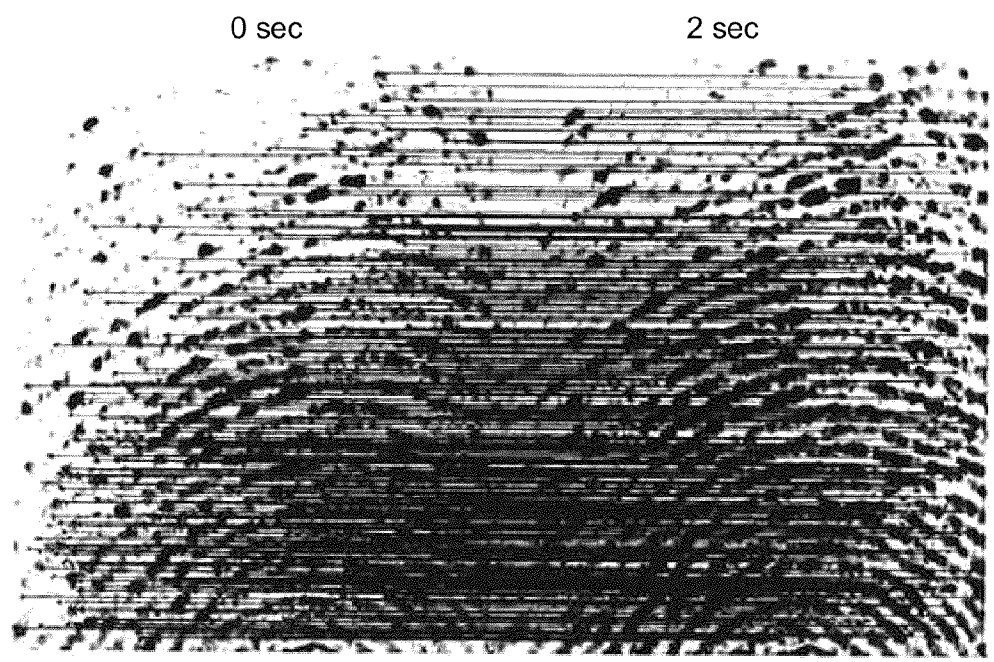
FIG. 14 is an illustration of demonstrating the linking between singularity points of the initial image and subsequent image of FIG. 13 according to an embodiment of the present invention.

The singularities of the initial image and subsequent image are compared to determine the number of matches. FIG. 14 is an illustration of demonstrating the linking between singularity points of the initial image and subsequent image of FIG. 13 according to an embodiment of the present invention. As illustrated in TABLE 3, "live" images have a larger number of matching singularity points while noisy and "not live" images typically have fewer matching points. Singularity point detection filters noisy and partial images and localizes the ridge information for further analysis

TABLE 3

|  | Live | Synthetic | Cadaver |
|---|---|---|---|
| Avg. Keypoints (0 sec) | 2111 | 1345 | 899 |
| Avg. Keypoints (2 sec) | 2832 | 1366 | 1341 |
| Avg. Matches Found | 932 | 98 | 167 |

In one embodiment, among others, if a sufficient amount of matched singularities are identified, then further processing of the image data is performed. As can be seen in TABLE 3, there is a detectable difference between the number of "live" image matched singularities and "not live" image (i.e., synthetic and cadaver) matched singularities. Thus, bad quality or partial "not live" images are rejected when the number of singularity points is below a selected threshold. This minimizes processing and response time.

If the number of singularities is not equal to and/or less than the threshold, the obtained point linking is mapped into a time domain signal using B-spline interpolation. One skilled in the art would understand that other forms of interpolation could be used. Other methods to perform interpolation include, but are not limited to, linear and polynomial interpolation. These signals are further processed using an Empirical Mode Decomposition (EMD) based technique.

The Empirical Mode Decomposition (EMD) method analyzes a signal by decomposing it into mono-components called Intrinsic Mode Functions (IMFs). The empirical nature of the approach may be partially attributed to a subjective definition of the envelope and the intrinsic mode function involved in the sifting process. The EMD method used in conjunction with a Hilbert Transform is effective for analyzing nonlinear, non-stationary signals. This combination is known as a Hilbert-Huang Transform (HHT), which is described in "The empirical mode decomposition and the hilbert spectrum for nonlinear and non-stationary time series analysis," N. E. Huang, S. R. Shea, M. C. Long, H. H. Wu, Q. Shih, N. C. Zheng, C. C. Yen, H. Ding, and H. Liu, *Proc. R. Soc. London*, vol. A-545, pp. 903-995, 1998, which is herein incorporated by reference in its entirety. Using the EMD method, the obtained signal f(t) can be represented in terms of IMFs as:

$$f(t) = \sum_{i=1}^{n} c_i(t) + r_n \qquad \text{(EQN. 18)}$$

where, $c_i(t)$ is the $i^{th}$ Intrinsic Mode Function and $r_n$ is the residue.

A set of analytic functions can be constructed for these IMFs. The analytic function z(t) of a typical IMF c(t) is a complex signal having the original signal c(t) as the real part and the Hilbert transform of the signal c(t) as its imaginary part. By representing the signal in polar coordinate form, one has:

$$z(t) = c(t) + jH[c(t)] = a(t)e^{j\phi(t)}, \qquad \text{(EQN. 19)}$$

where a(t) is the instantaneous amplitude and φ(t) is the instantaneous phase function. The instantaneous amplitude a(t) and the instantaneous phase function φ(t) can be calculated as:

$$a(t) = \sqrt{\{c(t)\}^2 + \{H[c(t)]\}^2}, \text{ and} \qquad \text{(EQN. 20)}$$

$$\phi(t) = \tan^{-1}\left\{\frac{H[c(t)]}{c(t)}\right\}. \qquad \text{(EQN. 21)}$$

The instantaneous frequency of a signal at time t can be expressed as the rate of change of phase angle function of the analytic function obtained by Hilbert Transform of the signal. The expression for instantaneous frequency is given by:

$$\omega(t) = \tan^{-1}\left\{\frac{d\phi(t)}{dt}\right\}. \qquad \text{(EQN. 22)}$$

Because of the capability of extracting instantaneous amplitude a(t) and instantaneous frequency ω(t) from the signal, this method can be used to analyze a non-stationary signal. In the case of a single harmonic signal, the phase angle of the Hilbert transform is a linear function of time and the instantaneous frequency is constant and equal to the frequency of the harmonic. In general, the concept of instantaneous frequency describes how the signal frequency content varies with the time.

The EMD method further decomposes the signal by sifting the IMFs. An allowable IMF is defined as a function which satisfy following two criterion:

The number of extrema and the number of zero crossings in the component must either equal or differ at most by one; and At any point, the mean value of the envelopes defined by the local maxima and the local minima are zero.

The sifting process to extract IMFs from the signal processes the signal iteratively to obtain a component, which satisfies above-mentioned conditions. These constraints on the decomposed components obtain a symmetrical mono-frequency component that guarantees a well-behaved Hilbert transform. A Hilbert transform behaves erratically if the original function is not symmetric about the x-axis or if there is a sudden change in the phase of the signal without crossing the x-axis.

Although the IMFs are well behaved in their Hilbert Transform, it may not necessarily have any physical significance. Moreover the empirical sifting process does not guarantee exact modal decomposition. The EMD method may lead to mode mixture and the signal may need to pass through a bandpass filter before analysis.

The sifting process separates the IMFs in decreasing order of frequency, i.e. it separates the high frequency component first and decomposes the residue obtained after separating each IMP until a residue of nearly zero frequency content is obtained. In this sense, the sifting process in the EMD method may be viewed as an implicit wavelet analysis and the concept of the intrinsic mode function in the EMD method parallels the wavelet details in wavelet analysis.

Wavelet packet analysis of the signal also can be used as a filter bank with adjustable time and frequency resolution. It results in symmetrical orthonormal components when a symmetrical orthogonal wavelet is used as the decomposition wavelet. As a signal can be decomposed into symmetrical orthonormal components with wavelet packet decomposition, this produces a well-behaved Hilbert transform. Thus, a sifting process based on wavelet packet decomposition can be used to analyze a non-stationary signal obtained from the fingerprint images. It may be used to detect what type of fingerprint has generated the signal.

A wavelet packet is represented as a function, $\psi_{j,k}^{i}$ where i is the modulation parameter, j is the dilation parameter, and k is the translation parameter.

$$\psi_{j,k}^{i}(t)=2^{-j/2}\psi^{i}(2^{-j}t-k). \quad \text{(EQN. 23)}$$

Here $i=[1, 2j^{n}]$ and n is the level of decomposition in the wavelet packet tree. The wavelet packet coefficients $c_{j,k}^{i}$ corresponding to the signal f(t) can be obtained as:

$$c_{j,k}^{i}(t)=\int_{-\infty}^{\infty}f(r)\psi_{j,k}^{i}(t)dt. \quad \text{(EQN. 24)}$$

The entropy E is an additive cost function that indicates the amount of information stored in the signal, e.g. the higher the entropy, more information is stored in the signal. Two representative definitions of entropy include, but are not limited to, energy entropy and Shannon entropy. One skilled in the art would understand that a unique entropy function could be defined, if necessary.

The wavelet packet node energy entropy at a particular node n in the wavelet packet-tree of a signal is a special case of P=2 of the P-norm entropy which is defined as:

$$e_n = \sum_k |c_{j,k}^i|^P \quad (P \geq 1). \quad \text{(EQN. 25)}$$

where $c_{j,k}^{i}$ are the wavelet packet coefficients at a particular node of wavelet packet tree. The wavelet packet node energy has more potential for use in signal classification when compared to the wavelet packet node coefficients alone. The wavelet packet node energy represents energy stored in a particular frequency band and is mainly used to extract the dominant frequency components of the signal. The Shannon entropy is defined as:

$$e_n = -\sum_k (c_{j,k}^i)^2 \log[(c_{j,k}^i)^2]. \quad \text{(EQN. 26)}$$

An entropy index (EI) is defined as a difference between the number of zero crossings and the number of extrema in a node component of the wavelet packet tree. An entropy index value greater than 1 indicates that the component has a potential to reveal more information about the signal and that it needs to be decomposed further in order to obtain additional frequency components of the signal.

The liveness of the fingerprint is based upon the percentage contribution of entropy energy in the sifted wavelet packet tree. The total entropy energy at the sifted (or selected) wavelet packet nodes is calculated and compared to a predetermined threshold. If the threshold is met or exceeded, then the fingerprint is classified as "live."

Figure 15:
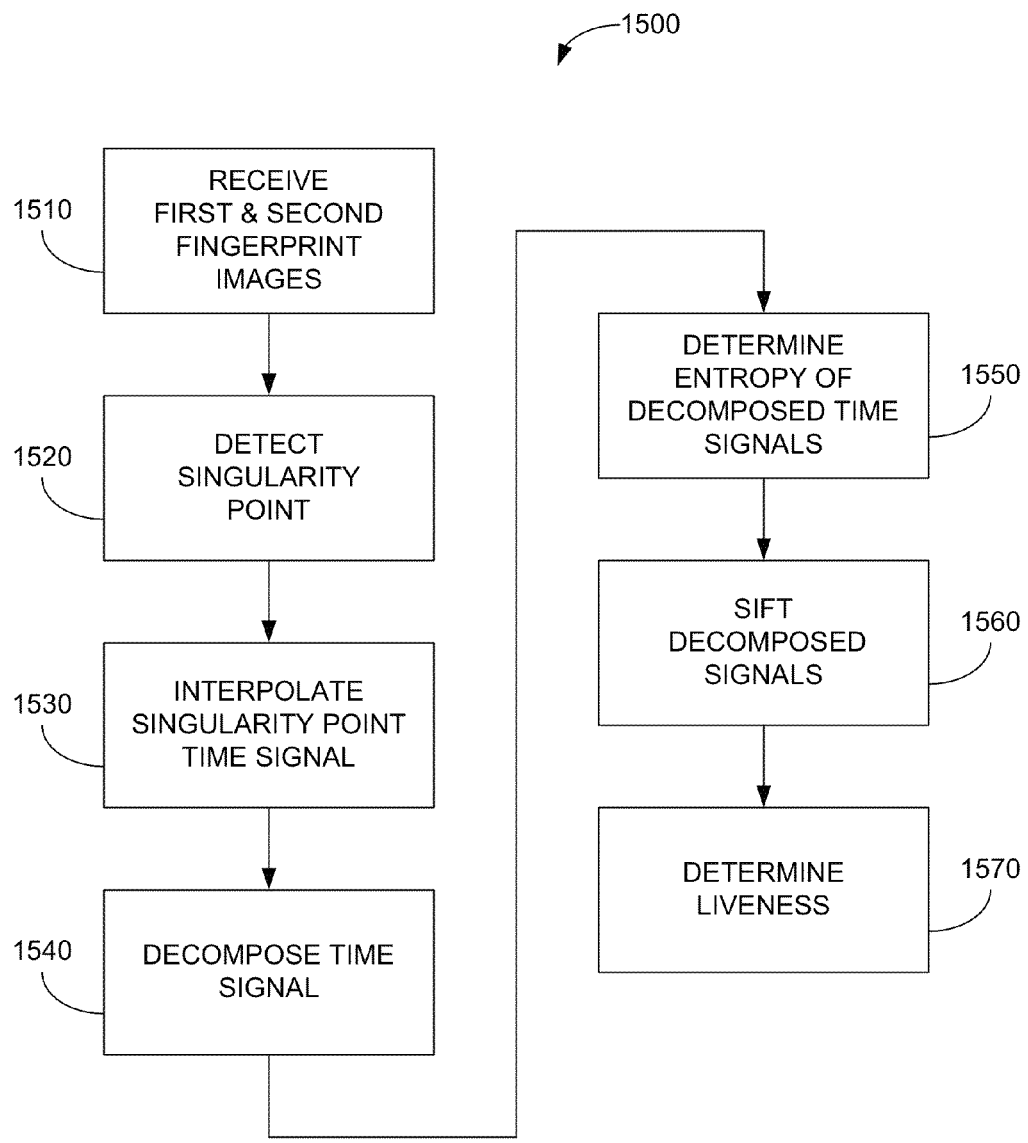
FIG. 15 is a flow chart that provides one example of the operation of a system to determine liveness of fingerprint images such as those illustrated in FIG. 13 according to an embodiment of the present invention according to an embodiment of the present invention.

Referring next to FIG. 15, shown is a flow chart 1500 that provides one example of the operation of a system to determine liveness of fingerprint images such as those illustrated in FIG. 13 according to an embodiment of the present invention. Alternatively, the flow chart of FIG. 15 may be viewed as depicting steps of an example of a method implemented in a processor system 1600 (FIG. 16) to determine liveness of fingerprint images as set forth above. The functionality of the fingerprint liveness detection as depicted by the example flow chart of FIG. 15 may be implemented, for example, in an object oriented design or in some other programming architecture. Assuming the functionality is implemented in an object oriented design, then each block represents functionality that may be implemented in one or more methods that are encapsulated in one or more objects. The fingerprint liveness detection may be implemented using any one of a number of programming languages such as, for example, C, C++, or other programming languages.

Beginning with block 1510, First and second fingerprint images are received. The images are sequentially obtained from the same fingerprint using a predetermined time delay. In one embodiment, such as that illustrated in FIG. 13, the second image is obtained two seconds after the first image. In another embodiment, a delay of five seconds is used.

Singularity point detection is performed in block 1520. Singularity point detection can be performed on the first and second fingerprint images. The singularities are compared between the two images to determine the number of matches. Live images have a larger number of matching singularity points. Noisy and "not live" images typically have fewer matching points. Singularity point detection filters noisy and partial images and localizes the ridge information for further analysis.

The localized ridge information at the matched singularity points is interpolated in block 1530 to provide time domain signals. Interpolation can be accomplished using cubic splines or other appropriate methods. The interpolated data increases the time resolution of the signal, which will in turn increase the regularity of the decomposed components. Use of cubic spline interpolation assures the conservation of signal data between sampled points without large oscillations.

In block 1540, the interpolated data is decomposed into different frequency components using wavelet packet decomposition. The shape of the decomposed components produced by wavelet analysis depends on the shape of the mother wavelet used for the decomposition. Daubechies wavelet of higher order (e.g., 16) has good symmetry, which leads to symmetrical and regular shaped components. One skilled in the art would understand that other wavelets may be used in the decomposition.

In the case of a binary wavelet packet tree, decomposition at level n results in $2^n$ components. This number may become very large at higher decomposition levels and necessitate increased computational efforts. An improved decomposition of the signal can be achieved using similar conditions to that required for an IMF. In this embodiment, a particular node (N) is split into two nodes $N_1$ and $N_2$ only if the entropy index of the corresponding node is greater than 1. Thus, the entropy of the wavelet packet decomposition is kept as minimal as possible. Other criteria such as, but not limited to, the minimum number of zero crossings and the minimum peak value of components can also be applied to decompose only the potential components in the signal. One skilled in the art would understand that decomposition could be unique if the mother wavelet in the wavelet packet analysis is defined and the sifting criteria are specified.

Once the decomposition is carried out, the entropy energies are determined from the components (block 1550) corresponding to the nodes of the wavelet packet tree. In block 1560, the percentage of the entropy energy contribution of the component corresponding to each node to the original signal can be used as the sifting criteria in order to identify appropriate signal components. This can be obtained by summing up the energy entropy corresponding to the terminal nodes of the wavelet packet tree of the signal decomposition to get total energy content. Then, the percentage contribution of entropy energy corresponding to each terminal node is calculated. The higher the contribution percentage, the more significant the component is. Sifting is based upon exceeding a predefined contribution percentage.

In other embodiments, the decomposed components of the signal can be sifted (block 1560) prior to determining the entropy energy in block 1550. In those embodiments, the decomposed signals can be sifted using the same criteria applied to IMFs. Other sifting criteria may also be utilized.

The liveness of the fingerprint is determined in block 1570. The percentage contribution of entropy energy in the wavelet packet tree at sifted (or selected) wavelet packet nodes is calculated and compared to a predetermined threshold. If the threshold is met or exceeded, then the fingerprint is classified as "live."

Figure 16:
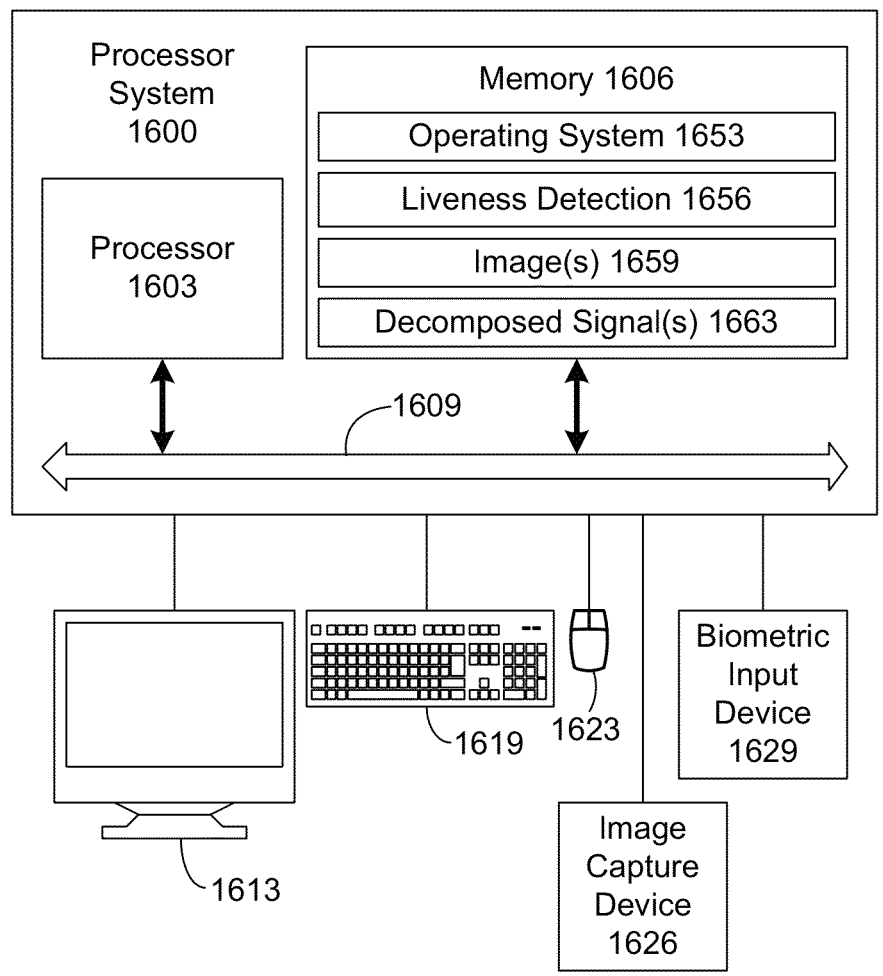
FIG. 16 a schematic block diagram of one example of a system employed to detect fingerprint liveness and to perform various analyses with respect to the fingerprint liveness detection according to an embodiment of the present invention.

Referring next to FIG. 16, shown is one example of a system that performs various functions using fingerprint liveness detection according to the various embodiments as set forth above. As shown, a processor system 1600 is provided that includes a processor 1603 and a memory 1606, both of which are coupled to a local interface 1609. The local interface 1609 may be, for example, a data bus with an accompanying control/address bus as can be appreciated by those with ordinary skill in the art. The processor system 1600 may comprise, for example, a computer system such as a server, desktop computer, laptop, personal digital assistant, or other system with like capability.

Coupled to the processor system 1600 are various peripheral devices such as, for example, a display device 1613, a keyboard 1619, and a mouse 1623. In addition, other peripheral devices that allow for the capture of various patterns may be coupled to the processor system 1600 such as, for example, an image capture device 1626, or a biometric input device 1629. The image capture device 1626 may comprise, for example, a digital camera or other such device that generates images that comprise patterns to be analyzed as described above. Also, the biometric input device 1629 may comprise, for example, a fingerprint input device, optical scanner, or other biometric device 1629 as can be appreciated.

Stored in the memory 1606 and executed by the processor 1603 are various components that provide various functionality according to the various embodiments of the present invention. In the example embodiment shown, stored in the memory 1606 is an operating system 1653 and a fingerprint liveness detection system 1656. In addition, stored in the memory 1606 are various images 1659 and various decomposed time signals 1663. The decomposed signals 1663 may be associated with corresponding ones of the various images 1659. The images 1659 and the decomposed signals 1663 may be stored in a database to be accessed by the other systems as needed. The images 1659 may comprise fingerprints such as the images in FIG. 13 or other patterns as can be appreciated. The images 1659 comprise, for example, a digital representation of physical patterns or digital information such as data, etc.

The fingerprint liveness detection system 1656 is executed by the processor 1603 in order to classify whether a fingerprint image is "live" or "not live" as described above. A number of software components are stored in the memory 1606 and are executable by the processor 1603. In this respect, the term "executable" means a program file that is in a form that can ultimately be run by the processor 1603. Examples of executable programs may be, for example, a compiled program that can be translated into machine code in a format that can be loaded into a random access portion of the memory 1606 and run by the processor 1603, or source code that may be expressed in proper format such as object code that is capable of being loaded into a of random access portion of the memory 1606 and executed by the processor 1603, etc. An executable program may be stored in any portion or component of the memory 1606 including, for example, random access memory, read-only memory, a hard drive, compact disk (CD), floppy disk, or other memory components.

The memory 1606 is defined herein as both volatile and nonvolatile memory and data storage components. Volatile components are those that do not retain data values upon loss of power. Nonvolatile components are those that retain data upon a loss of power. Thus, the memory 1606 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

The processor 1603 may represent multiple processors and the memory 1606 may represent multiple memories that operate in parallel. In such a case, the local interface 1609 may be an appropriate network that facilitates communication between any two of the multiple processors, between any processor and any one of the memories, or between any two of the memories etc. The processor 1603 may be of electrical, optical, or molecular construction, or of some other construction as can be appreciated by those with ordinary skill in the art.

The operating system 1653 is executed to control the allocation and usage of hardware resources such as the memory, processing time and peripheral devices in the processor system 1600. In this manner, the operating system 1653 serves as the foundation on which applications depend as is generally known by those with ordinary skill in the art.

Experimental Validation

Figure 17:
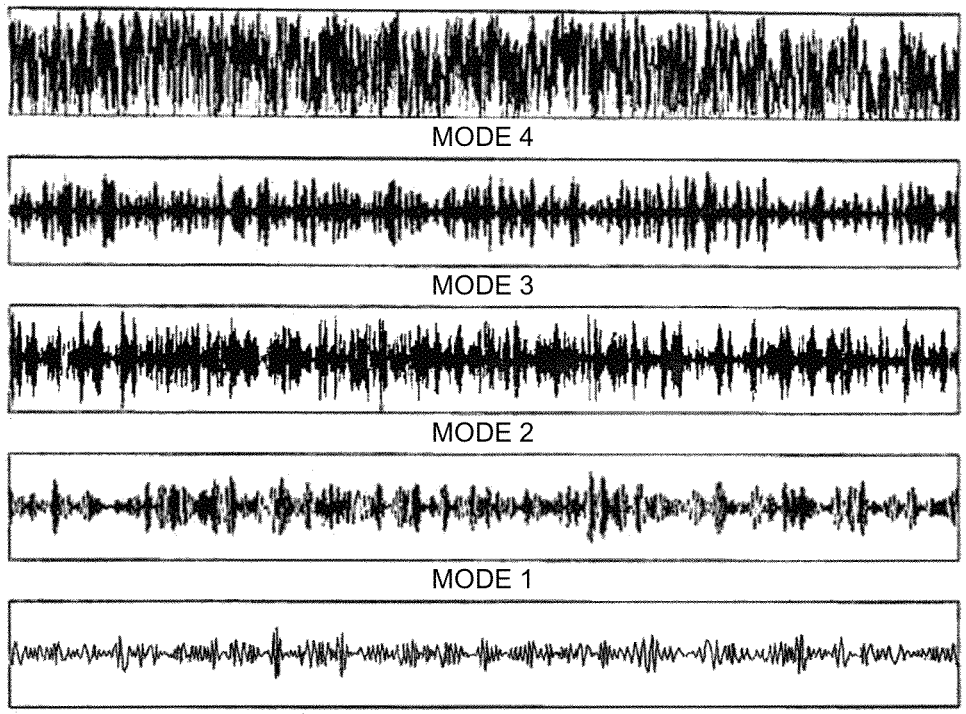
FIG. 17 illustrates EMD decomposition of live and synthetic fingerprints according to an embodiment of the present invention.
Figure 17:
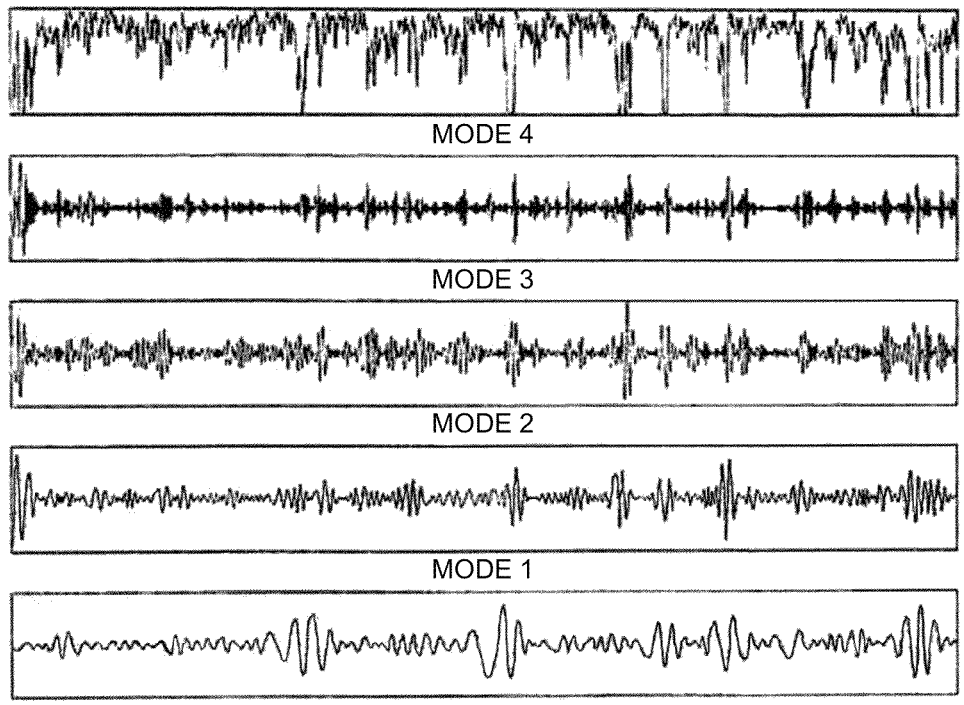

The described technique was applied to fingerprint images captured at 0 and after 2 sec from three finger categories: 58 live; 28 cadaver; and 50 synthetic. EMD decomposition was applied to each image for four modes. The described technique was applied to the obtained fingerprint images to determine singularity points. B-spline interpolation was used to produce time domain signals, which were decomposed using Daubechies wavelets. FIG. 17 illustrates EMD decomposition of (a) live and (b) synthetic fingerprints according to an embodiment of the present invention.

The average percentage contribution of energy in wavelet packet tree at most common packet nodes was calculated for the second, third, and fourth modes for each type of fingerprint scanner. TABLES 4, 5, and 6 show the average percentage contribution of entropy energy for Ethentica, Secugen, and Precise Biometrics scanners, respectively. Classification rates of 93%, 98.9% and 89.2% were achieved for Secugen, Precise Biometrics and Ethentica, respectively.

TABLE 4

| Mode No. | Packet Node | Live | Synthetic | Cadaver |
| --- | --- | --- | --- | --- |
| 2 | (8, 1) | 52.2 | 6.3 | 3.9 |
| 3 | (7, 0) | 61.3 | 11.2 | 14.8 |
| 4 | (6, 1) | 91.2 | 57.3 | 37.3 |

TABLE 5

| Mode No. | Packet Node | Live | Synthetic | Cadaver |
| --- | --- | --- | --- | --- |
| 2 | (8, 1) | 46.5 | 12.2 | 0.6 |
| 3 | (7, 0) | 71.3 | 22 | 5.5 |
| 4 | (6, 1) | 77.2 | 28.7 | 41.2 |

TABLE 6

| Mode No. | Packet Node | Live | Synthetic | Cadaver |
| --- | --- | --- | --- | --- |
| 2 | (8, 1) | 31.2 | 2 | 3.1 |
| 3 | (7, 0) | 60 | 19.9 | 32.6 |
| 4 | (6, 1) | 86.5 | 44.3 | 56.4 |

Although the fingerprint liveness detection systems 556, 1056, and/or 1656 are described as being embodied in software or code executed by general purpose hardware as discussed above, as an alternative the same may also be embodied in dedicated hardware or a combination of software/general purpose hardware and dedicated hardware. If embodied in dedicated hardware, each of the fingerprint liveness detection systems 556, 1056, and/or 1656 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow charts of FIGS. 5, 10, and 16 show the architecture, functionality, and operation of an implementation of the fingerprint liveness detection systems 556, 1056, and/or 1656. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although flow charts of FIGS. 5, 10, and 16 show a specific order of execution, it is understood that the order of execution may differ from that which is depicted. For example, the order of execution of two or more blocks may be scrambled relative to the order shown. Also, two or more blocks shown in succession in FIGS. 5, 10, and 16 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where each of the fingerprint liveness detection systems 556, 1056, and/or 1656 may comprise software or code, each can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the fingerprint liveness detection systems 556, 1056, and/or 1656 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

At least the following is claimed:

1. A method for determining fingerprint liveness, comprising:

generating, by a processor system, a histogram of at least a portion of a fingerprint image;

determining, by the processor system, multi-resolution texture analysis data from the histogram;

condensing, by the processor system, image analysis data including the multi-resolution texture analysis data to produce condensed image analysis data;

processing, by the processor system, the condensed image analysis data to determine a condensed data location within a cluster;

determining, by the processor system, a distance between the condensed data location and a centroid of the cluster; and determining, by the processor system, liveness of the fingerprint image based upon the distance and a predefined threshold.

2. The method of claim 1, wherein the histogram is based upon a plurality of equally spaced bins corresponding to different grayscale levels.

3. The method of claim 2, wherein the histogram is normalized to provide a grayscale level distribution function for the fingerprint image.

4. The method of claim 1, wherein condensing the image analysis data comprises principal component analysis.

5. The method of claim 1, wherein the processing of the condensed image analysis data to determine the condensed data location within the cluster is performed by fuzzy c-means clustering.

6. The method of claim 1, wherein the multi-resolution texture analysis data comprises a first order function.

7. The method of claim 1, further comprising:
generating a co-occurrence matrix of the at least a portion of the fingerprint image; and
determining multi-resolution texture analysis data from the co-occurrence matrix.

8. The method of claim 7, wherein the multi-resolution texture analysis data comprises a second order function.

9. The method of claim 1, wherein the at least a portion of the fingerprint image is a region of interest of the fingerprint image.

10. The method of claim 9, wherein the region of interest is determined about a center of the fingerprint image.

11. A system, comprising:
a processor circuit having a processor and a memory; and
a detection system stored in the memory and executable by the processor, the detection system comprising:
logic that determines multi-resolution texture analysis data from a histogram of at least a portion of a fingerprint image;
logic that condenses image analysis data including the multi-resolution texture analysis data to produce condense image analysis data;
logic that processes the condensed image analysis data to determine a condensed data location within a cluster;
logic that determines a distance between the condensed data location and a centroid of the cluster; and
logic that determines liveness of the fingerprint image based upon the distance and a predefined threshold.

12. The system of claim 11, wherein the detection system further comprises logic that generates the histogram of the at least a portion of the fingerprint image.

13. The system of claim 12, wherein the histogram is based upon a plurality of equally spaced bins corresponding to different grayscale levels.

14. The system of claim 13, wherein the histogram is normalized to provide a grayscale level distribution function for the fingerprint image.

15. The system of claim 14, wherein the detection system further comprises logic that determines statistical features of the fingerprint image based upon the grayscale level distribution function.

16. The system of claim 11, wherein the at least a portion of the fingerprint image is a region of interest of the fingerprint image.

17. The system of claim 16, wherein the detection system further comprises logic that extracts the region of interest from the fingerprint image.

18. The system of claim 17, wherein the region of interest is about a center of the fingerprint image.

19. The system of claim 12, wherein the detection system further comprises logic that removes one or more sections of the fingerprint image that exhibit a below a predefined threshold value prior to generating the histogram.

20. A system, comprising:
means for generating a histogram of at least a portion of a fingerprint image;
means for determining multi-resolution texture analysis data from the histogram;
means for condensing image analysis data including the multi-resolution texture analysis data to produce condensed data;
means for processing the condensed data to determine a condensed data location within a cluster;
means for determining a distance between the condensed data location and a centroid of the cluster; and
means for determining liveness of the fingerprint image based upon the distance and a predefined threshold.

* * * * *